United States Patent
Nunokawa et al.

(10) Patent No.: US 9,351,188 B2
(45) Date of Patent: May 24, 2016

(54) WIRELESS BASE STATION DEVICE, WIRELESS SYSTEM, AND FAILURE DETECTION METHOD

(71) Applicant: FUJITSU LIMITED, Kawasaki-shi, Kanagawa (JP)

(72) Inventors: Kenichi Nunokawa, Kawasaki (JP); Hiroyuki Kida, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 14/560,096

(22) Filed: Dec. 4, 2014

(65) Prior Publication Data

US 2015/0201341 A1 Jul. 16, 2015

(30) Foreign Application Priority Data

Jan. 15, 2014 (JP) ................................. 2014-005355

(51) Int. Cl.
*H04B 7/00* (2006.01)
*H04W 24/08* (2009.01)
*H04W 24/04* (2009.01)
*H04W 24/10* (2009.01)

(52) U.S. Cl.
CPC .............. *H04W 24/08* (2013.01); *H04W 24/04* (2013.01); *H04W 24/10* (2013.01)

(58) Field of Classification Search
CPC ..... H04W 24/10; H04W 24/02; H04W 24/08; H04W 36/30; H04W 24/04; H04W 28/0226; H04W 72/042; H04W 72/085; H04W 48/10
USPC ......... 455/507, 509, 508, 511, 514, 515, 500, 455/517, 513, 524, 525, 67.11, 423–425, 455/422.1, 436.1–444, 404.1, 450, 452.1, 455/452.2, 550.1, 575.1, 561; 370/310, 370/328, 329, 338, 252
See application file for complete search history.

(56) References Cited

U.S. PATENT DOCUMENTS

2011/0190016 A1    8/2011   Hamabe et al.
2013/0143550 A1*   6/2013   Ostrup ................. H04W 24/10
                                                    455/424

FOREIGN PATENT DOCUMENTS

| EP | 2154918 A1   | 2/2010 |
| JP | 2009-147462  | 7/2009 |
| JP | 2011-119976  | 6/2011 |
| JP | 2012-124707  | 6/2012 |

OTHER PUBLICATIONS

EESR—Extended European Search Report mailed on Jun. 17, 2015 for corresponding European Application No. 14196209.2.

* cited by examiner

Primary Examiner — Keith Ferguson
(74) Attorney, Agent, or Firm — Fujitsu Patent Center

(57) ABSTRACT

A wireless base station device includes a broadcast signal transmission unit that transmits a broadcast signal to a cell; a measurement signal communication unit that transmits to a mobile terminal device existing in the cell a measurement instruction signal and receives a measurement report signal from the mobile terminal device; a failure detection processing unit that detects a failure of a first cell with respect to a transmission function from the wireless base station to the first cell according to whether a measurement report signal including a measurement report of a wireless quality for a second cell measured by a mobile terminal device existing in a coverage area of the first cell is received or not; and an alarm signal transmission unit that transmits an alarm signal to notify a failure monitoring device of an occurrence of the failure of the first cell.

12 Claims, 29 Drawing Sheets

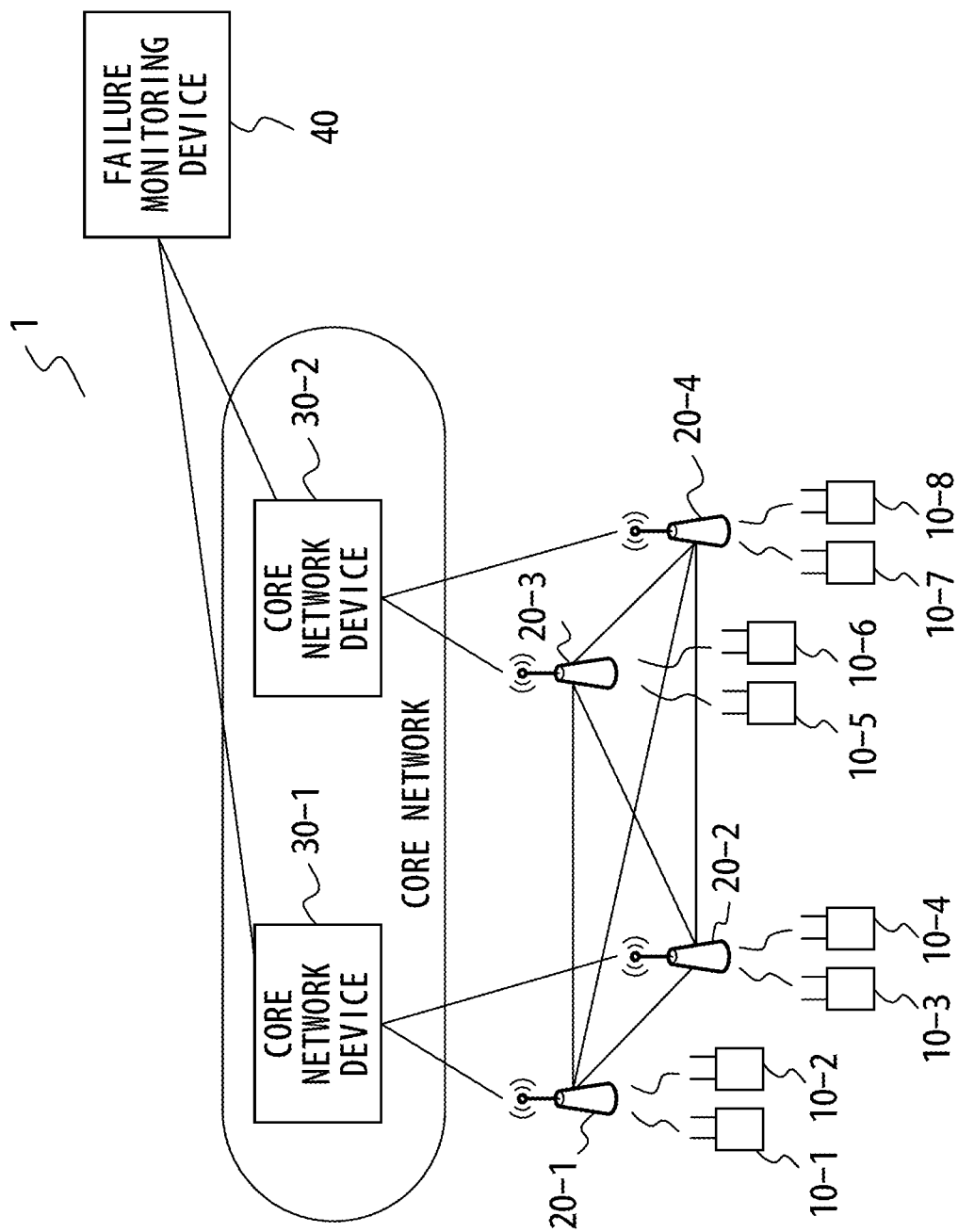
F I G. 1

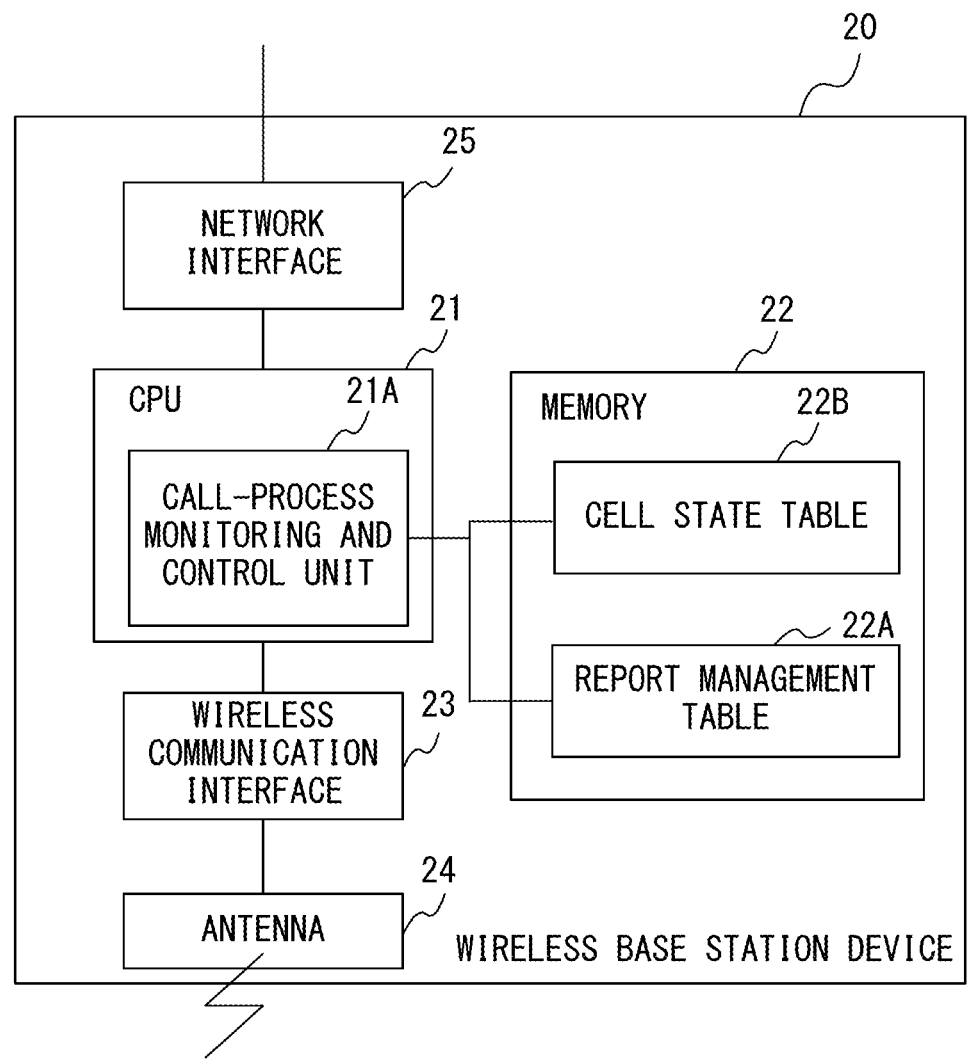
F I G. 3

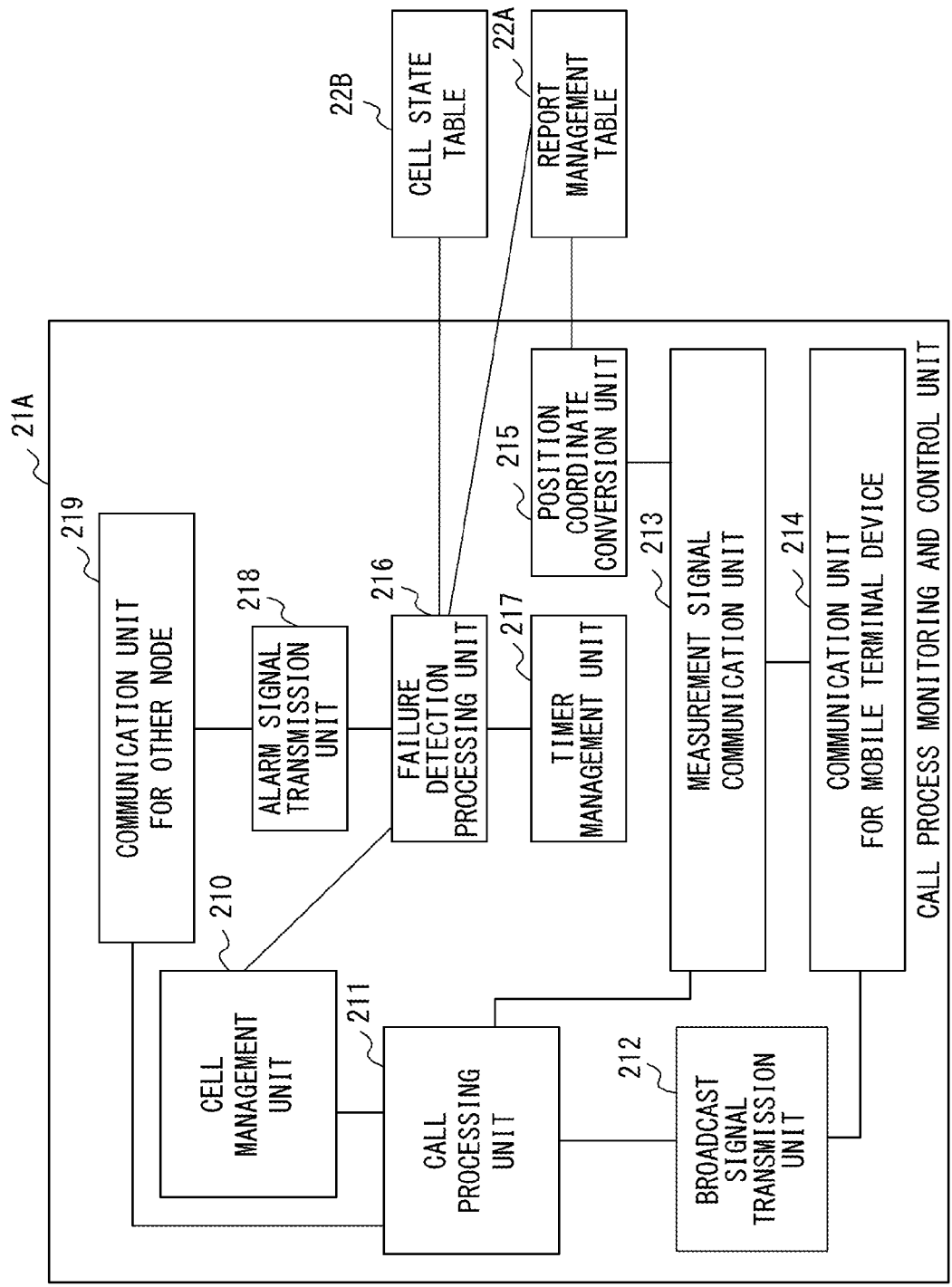
F I G. 4

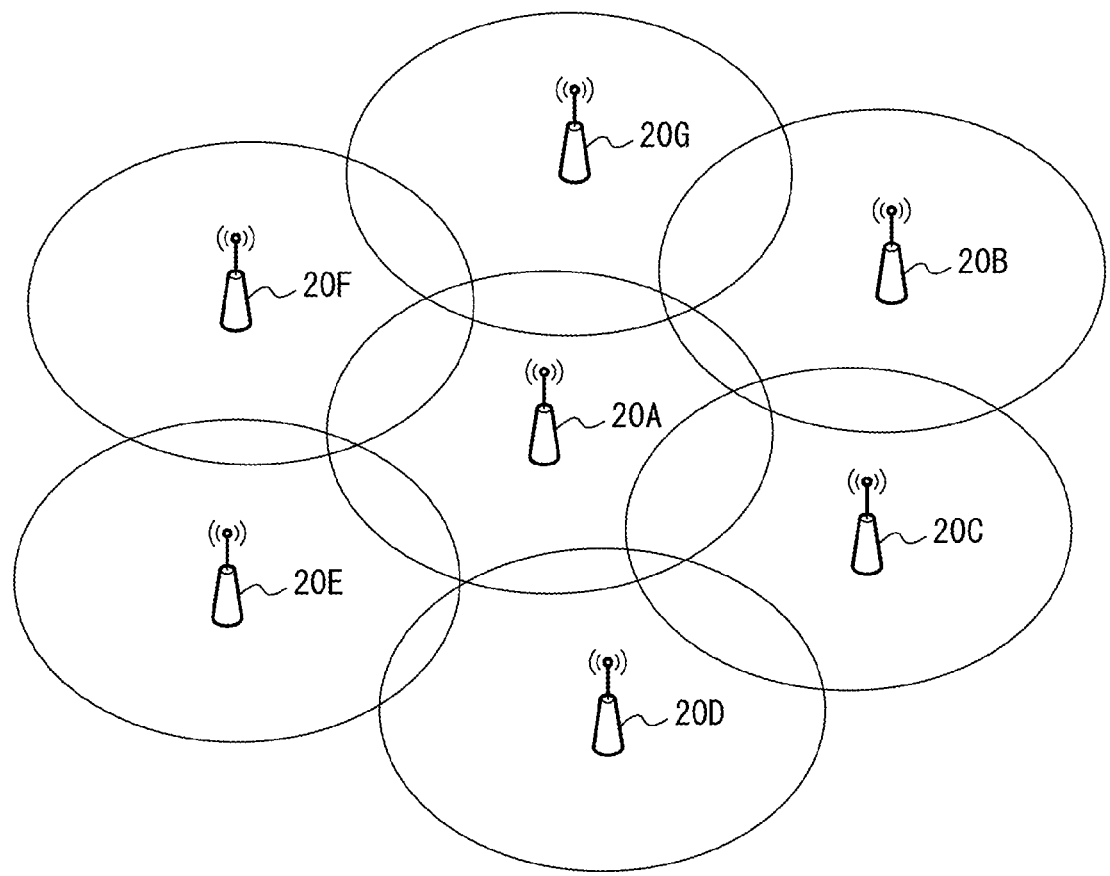
F I G. 5

| CELL NUMBER | EXISTENCE OR NON-EXISTENCE OF REPORT NUMBER | COORDINATE MESH NUMBER ||||| COVERAGE AREA |
|---|---|---|---|---|---|---|---|
| | | 1 | 2 | 3 | 4 | ... | 12 | |
| CELL A-1 | — | — | — | — | — | — | — | — |
| CELL A-2 | — | — | — | — | — | — | — | — |
| CELL A-3 | — | — | — | — | — | — | — | — |
| CELL A-4 | — | — | — | — | — | — | — | — |
| CELL A-5 | — | — | — | — | — | — | — | — |
| CELL A-6 | — | — | — | — | — | — | — | — |
| CELL B-4 | — | — | — | — | — | — | — | — |
| CELL B-5 | — | — | — | — | — | — | — | — |
| CELL C-5 | — | — | — | — | — | — | — | — |
| CELL D-6 | — | — | — | — | — | — | — | — |
| ... | — | — | — | — | — | — | — | — |
| CELL G-3 | — | — | — | — | — | — | — | — |
| ALL CELLS | — | — | — | — | — | — | — | — |

F I G. 6

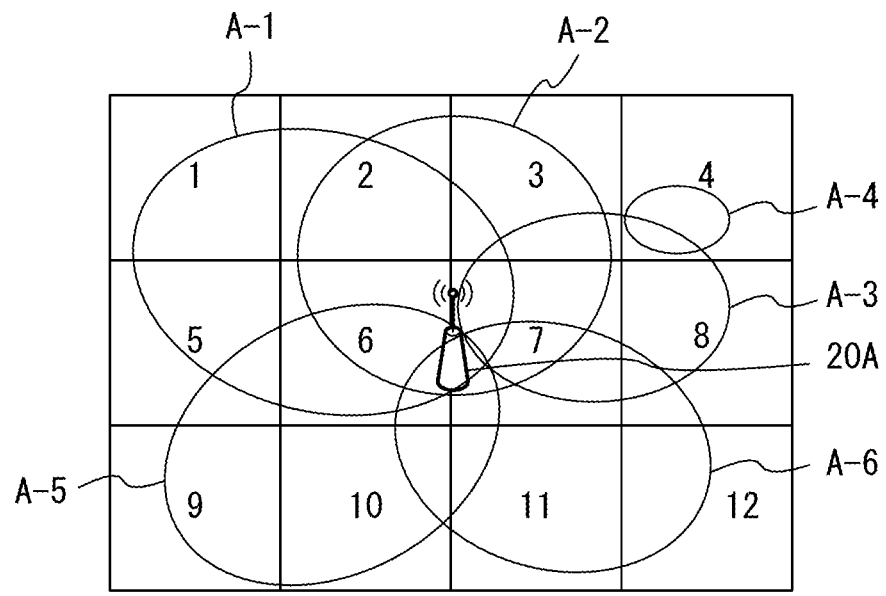
F I G. 7

| POSITION INFORMATION (LATITUDE/LONGITUDE) | QUALITY INFORMATION CELL A-1 | QUALITY INFORMATION CELL A-2 | QUALITY INFORMATION CELL ... | QUALITY INFORMATION CELL X-Y |
|---|---|---|---|---|

F I G. 8

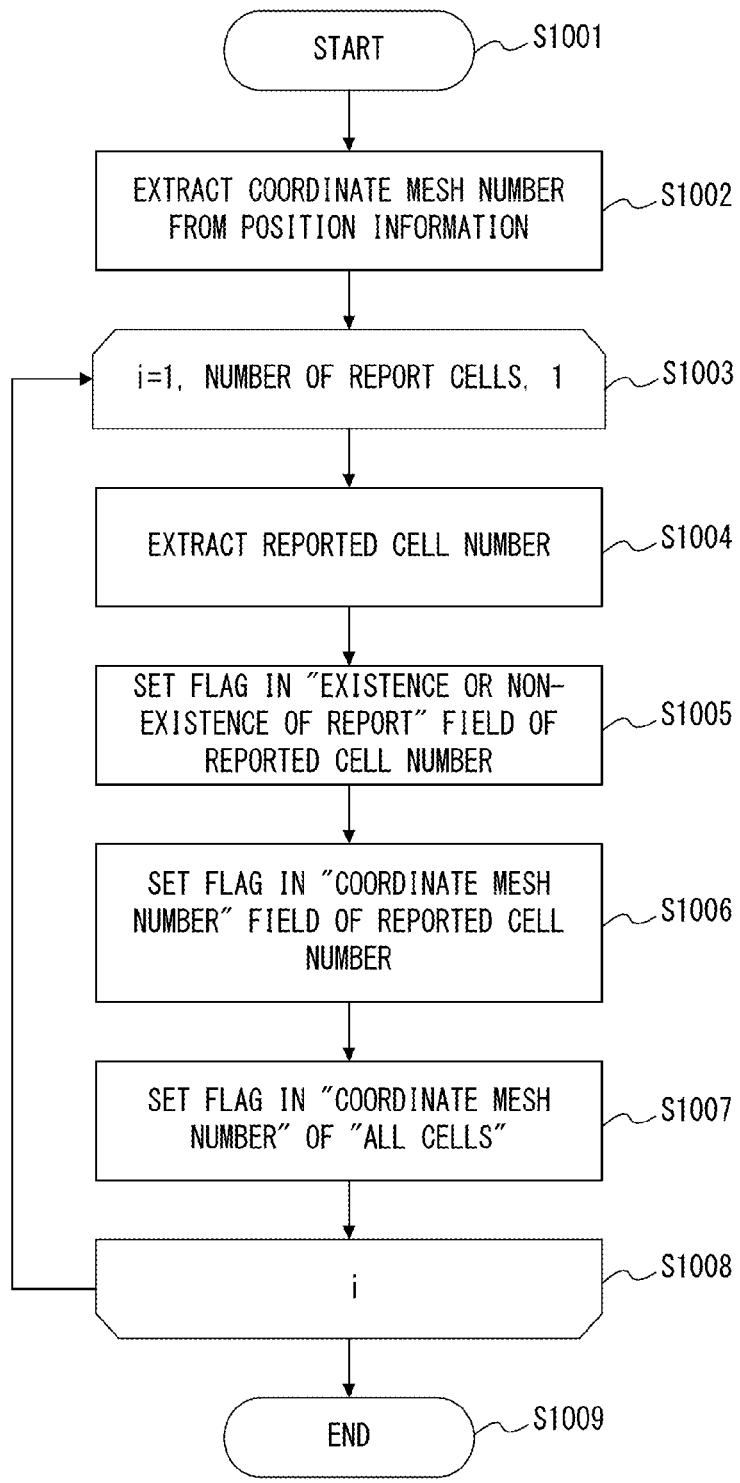
F I G. 9

| CELL NUMBER | EXISTENCE OR NON-EXISTENCE OF REPORT | COORDINATE MESH NUMBER | | | | | | COVERAGE AREA |
|---|---|---|---|---|---|---|---|---|
| | | 1 | 2 | 3 | 4 | ... | 12 | |
| CELL A-1 | ○ | ○ | ○ | ○ | – | ○ | – | |
| CELL A-2 | ○ | – | ○ | ○ | – | ○ | – | |
| CELL A-3 | ○ | – | – | ○ | ○ | ○ | – | |
| CELL A-4 | ○ | – | – | – | ○ | – | – | |
| CELL A-5 | ○ | – | – | – | – | ○ | ○ | |
| CELL A-6 | ○ | – | – | – | ○ | ○ | – | |
| CELL B-4 | ○ | – | – | – | – | ○ | – | |
| CELL B-5 | ○ | – | – | – | – | ○ | ○ | |
| CELL C-5 | ○ | – | – | – | – | ○ | ○ | |
| CELL D-6 | ○ | ○ | – | ○ | – | – | – | |
| ... | ○ | ○ | ○ | ○ | – | ○ | – | |
| CELL G-3 | ○ | ○ | ○ | ○ | – | ○ | – | |
| ALL CELLS | ○ | ○ | ○ | ○ | ○ | ○ | ○ | |

FIG. 10

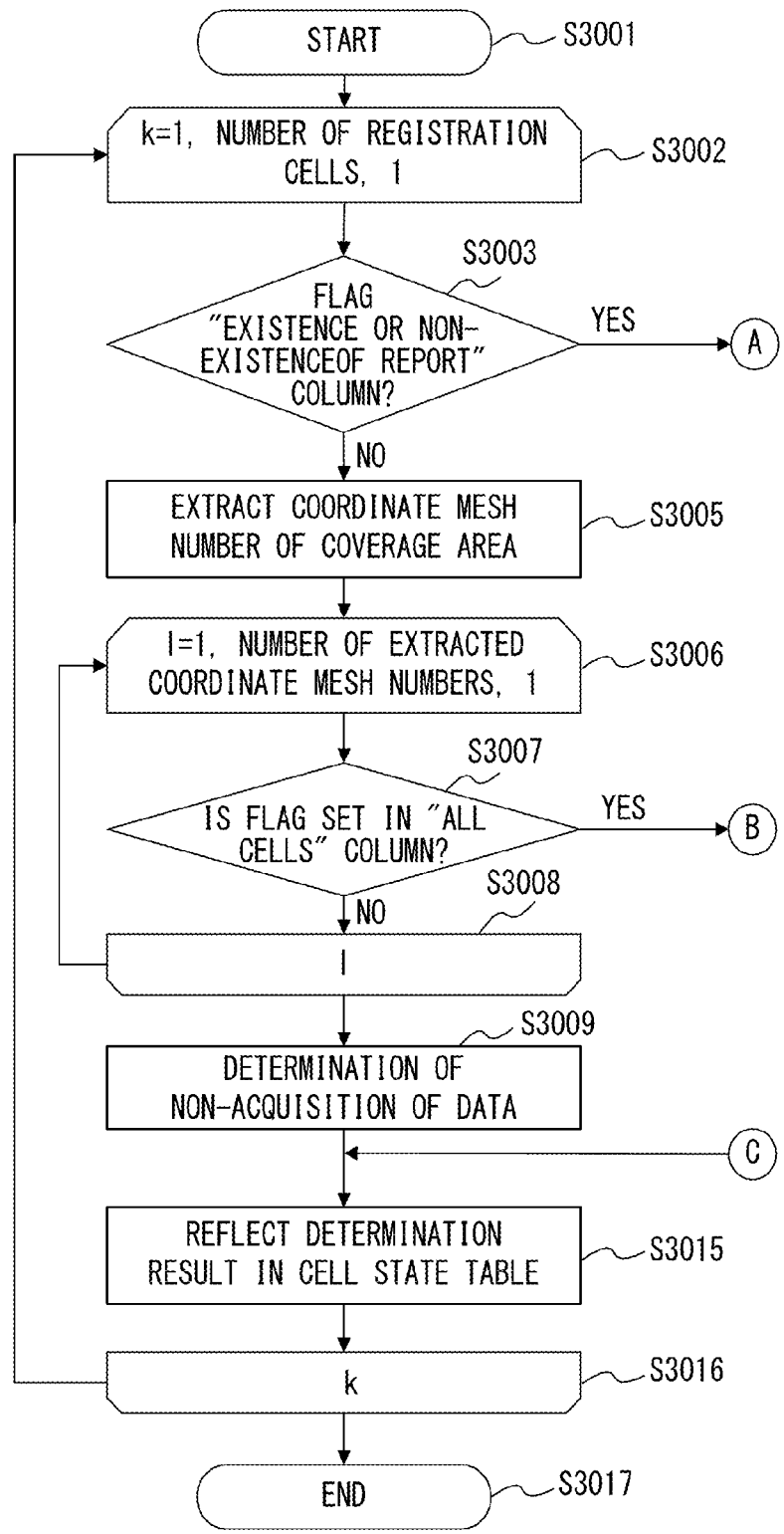
F I G. 1 2 A

FIG. 13

| CELL NUMBER | EXISTENCE OR NON-EXISTENCE OF REPORT | COORDINATE MESH NUMBER ||||| COVERAGE AREA |
| | | 1 | 2 | 3 | 4 | ... | 12 | |
|---|---|---|---|---|---|---|---|---|
| CELL A-1 | — | — | — | — | — | — | — | 1, 2, 3, ... |
| CELL A-2 | ○ | ○ | ○ | ○ | — | ○ | — | 1, 2, 3 |
| CELL A-3 | — | — | — | — | — | — | — | 3, 4, ... |
| CELL A-4 | — | — | — | — | — | — | — | 4 |
| CELL A-5 | ○ | — | — | — | — | ○ | — | ... |
| CELL A-6 | ○ | — | — | — | — | ○ | ○ | ..., 12 |
| CELL B-4 | — | — | — | — | — | ○ | — | ... |
| CELL B-5 | ○ | — | — | — | — | — | — | ... |
| CELL C-5 | ○ | — | — | — | — | ○ | ○ | ..., 12 |
| CELL D-6 | ○ | — | — | — | — | — | ○ | 12 |
| ... | ○ | — | — | — | — | ○ | — | ... |
| CELL G-3 | ○ | ○ | ○ | ○ | — | ○ | — | 1, 2, 3, ... |
| ALL CELLS | ○ | ○ | ○ | ○ | — | ○ | ○ | — |

| CELL NUMBER | OPERATION STATE | FAILURE DETERMINATION RESULT |
|---|---|---|
| CELL A-1 | IN OPERATION | FAILURE |
| CELL A-2 | IN OPERATION | NO FAILURE |
| CELL A-3 | WAVE-STOPPED | NO FAILURE |
| CELL A-4 | IN OPERATION | NON-ACQUISITION OF DATA |
| CELL A-5 | IN OPERATION | NO FAILURE |
| CELL A-6 | IN OPERATION | NO FAILURE |
| CELL B-4 | — | NO FAILURE |
| CELL B-5 | — | FAILURE |
| CELL C-5 | — | NO FAILURE |
| CELL D-6 | — | NO FAILURE |
| ... | — | NO FAILURE |
| CELL G-3 | — | NO FAILURE |

F I G. 1 4

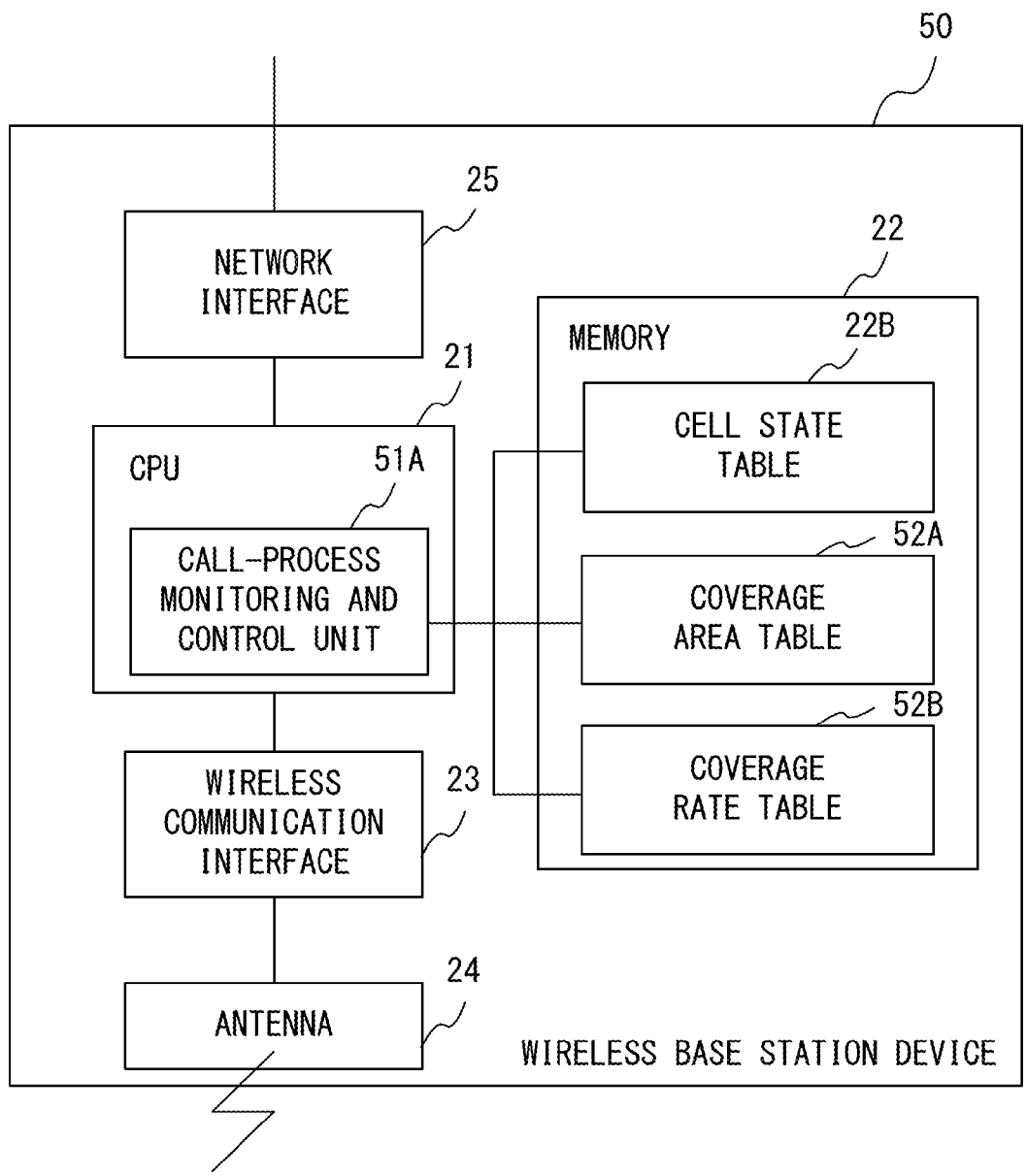
F I G. 1 5

| COORDINATE MESH NUMBER | REPORT CELL NUMBER |
|---|---|
| 1 | — |
| ... | — |
| 32 | — |
| 33 | — |
| 34 | — |
| ... | — |
| 96 | — |

FIG. 17

| CELL NUMBER | COORDINATE MESH NUMBER | NUMBER OF REGISTRATED SECTIONS | MAXIMUM NUMBER OF SECTIONS | COVERAGE RATE |
|---|---|---|---|---|
| CELL A-1 | — | — | — | — |
| CELL A-2 | — | — | — | — |
| CELL A-3 | — | — | — | — |
| CELL A-4 | — | — | — | — |
| CELL A-5 | — | — | — | — |
| CELL A-6 | — | — | — | — |
| CELL B-4 | — | — | — | — |
| CELL B-5 | — | — | — | — |
| CELL C-5 | — | — | — | — |
| CELL D-6 | — | — | — | — |
| ... | — | — | — | — |
| CELL G-3 | — | — | — | — |

FIG. 18

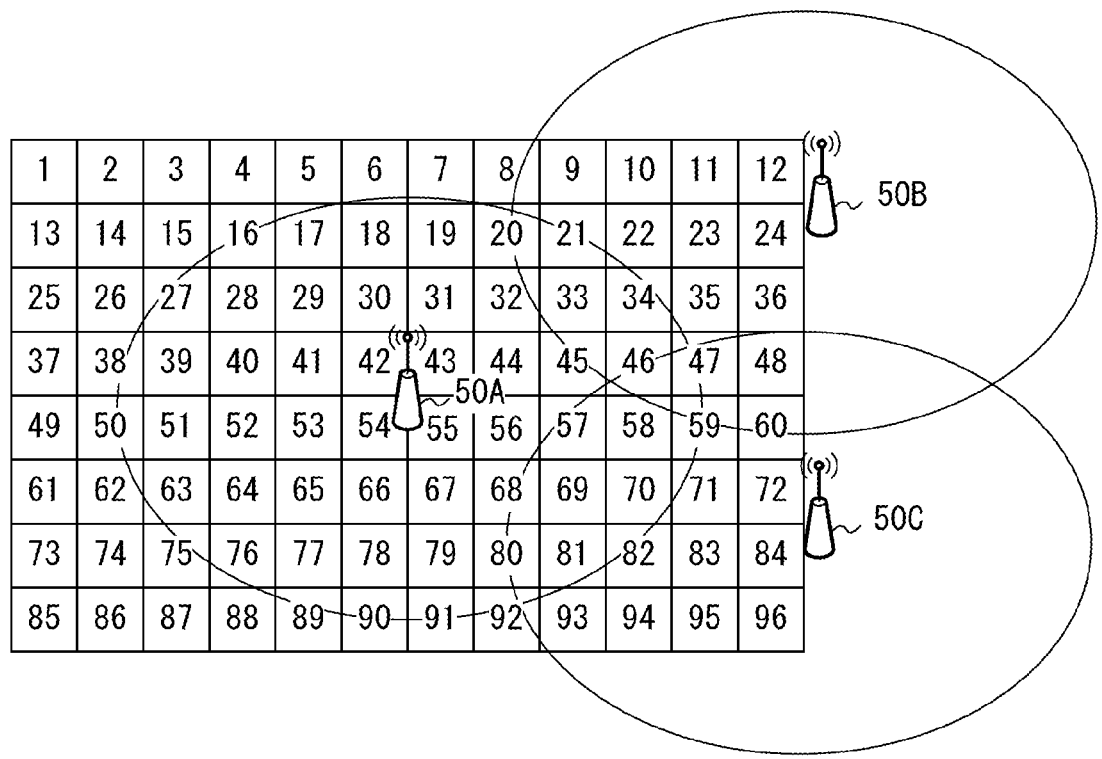
F I G. 19

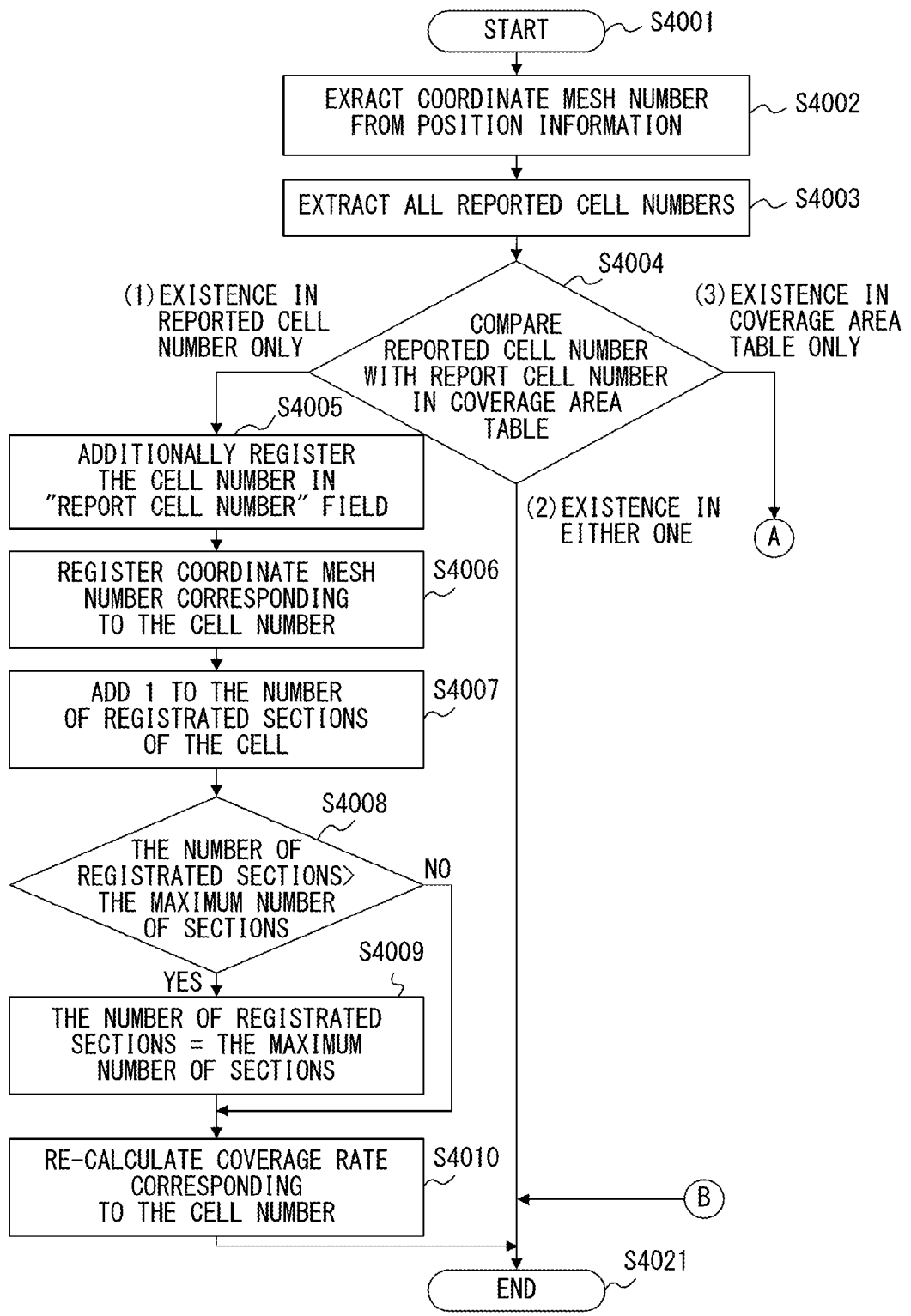
F I G. 20A

| COORDINATE MESH NUMBER | REPORT CELL NUMBER |
|---|---|
| 1 | — |
| ... | — |
| 32 | — |
| 33 | CELL A-2、CELL A-3、CELL B-4、CELL B-5 |
| 34 | — |
| ... | — |
| 96 | — |

FIG. 21

| CELL NUMBER | COORDINATE MESH NUMBER | NUMBER OF REGISTRATED SECTIONS | MAXIMUM NUMBER OF SECTIONS | COVERAGE RATE |
|---|---|---|---|---|
| CELL A-1 | — | — | — | — |
| CELL A-2 | 33 | 1 | 1 | 100% |
| CELL A-3 | 33 | 1 | 1 | 100% |
| CELL A-4 | — | — | — | — |
| CELL A-5 | — | — | — | — |
| CELL A-6 | — | — | — | — |
| CELL B-4 | 33 | 1 | 1 | 100% |
| CELL B-5 | 33 | 1 | 1 | 100% |
| CELL C-5 | — | — | — | — |
| CELL D-6 | — | — | — | — |
| ... | — | — | — | — |
| CELL G-3 | — | — | — | — |

FIG. 22

| COORDINATE MESH NUMBER | REPORT CELL NUMBER |
|---|---|
| 1 | — |
| ... | — |
| 32 | CELL A-2、CELL A-3、CELL B-5 |
| 33 | CELL A-2、CELL A-3、CELL B-4、CELL B-5 |
| 34 | CELL A-2、CELL A-3、CELL B-4、CELL B-5 |
| ... | — |
| 96 | — |

FIG. 23

| CELL NUMBER | COORDINATE MESH NUMBER | NUMBER OF REGISTRATED SECTIONS | MAXIMUM NUMBER OF SECTIONS | COVERAGE RATE |
|---|---|---|---|---|
| CELL A-1 | ... | ... | ... | ... |
| CELL A-2 | 18, 19, 20, 21, 22, 30, 31, 32, 33, 34, 35, 42, 43, 44, 45 | 15 | 15 | 100% |
| CELL A-3 | 43, 44, 45, 46, 47, 55, 56, 57, 58, 59, 68, 69, 70, 71 | 14 | 14 | 100% |
| CELL A-4 | ... | ... | ... | ... |
| CELL A-5 | ... | ... | ... | ... |
| CELL A-6 | ... | ... | ... | ... |
| CELL B-4 | 33, 34, 35, 45, 46, 47, 58, 59, 60 | 9 | 9 | 100% |
| CELL B-5 | 20, 21, 22, 32, 33, 34, 35, 45, 46, 47 | 10 | 10 | 100% |
| CELL C-5 | ... | ... | ... | ... |
| CELL D-6 | ... | ... | ... | ... |
| ... | ... | ... | ... | ... |
| CELL G-3 | ... | ... | ... | ... |

FIG. 24

| COORDINATE MESH NUMBER | REPORT CELL NUMBER |
|---|---|
| 1 | — |
| ... | — |
| 32 | CELL A-2、CELL A-3、CELL B-5 |
| 33 | CELL A-3、CELL B-4、CELL B-5 |
| 34 | CELL A-2、CELL A-3、CELL B-4、CELL B-5 |
| ... | — |
| 96 | — |

F I G. 2 5

| CELL NUMBER | COORDINATE MESH NUMBER | NUMBER OF REGISTRATED SECTIONS | MAXIMUM NUMBER OF SECTIONS | COVERAGE RATE |
|---|---|---|---|---|
| CELL A-1 | ... | ... | ... | ... |
| CELL A-2 | 18, 19, 20, 21, 22, 30, 31, 32, 34, 35, 42, 43, 44, 45 | 14 | 15 | 93% |
| CELL A-3 | 43, 44, 45, 46, 47, 55, 56, 57, 58, 59, 68, 69, 70, 71 | 14 | 14 | 100% |
| CELL A-4 | ... | ... | ... | ... |
| CELL A-5 | ... | ... | ... | ... |
| CELL A-6 | ... | ... | ... | ... |
| CELL B-4 | 33, 34, 35, 45, 46, 47, 58, 59, 60 | 9 | 9 | 100% |
| CELL B-5 | 20, 21, 22, 32, 33, 34, 35, 45, 46, 47 | 10 | 10 | 100% |
| CELL C-5 | ... | ... | ... | ... |
| CELL D-6 | ... | ... | ... | ... |
| ... | ... | ... | ... | ... |
| CELL G-3 | ... | ... | ... | ... |

FIG. 26

| CELL NUMBER | OPERATION STATE | FAILURE DETERMINATION RESULT |
|---|---|---|
| CELL A-1 | IN OPERATION | NON-EXISTENCE OF FAILURE |
| CELL A-2 | IN OPERATION | EXISTENCE OF FAILURE |
| CELL A-3 | IN OPERATION | NON-EXISTENCE OF FAILURE |
| CELL A-4 | IN OPERATION | NON-EXISTENCE OF FAILURE |
| CELL A-5 | IN OPERATION | NON-EXISTENCE OF FAILURE |
| CELL A-6 | IN OPERATION | NON-EXISTENCE OF FAILURE |
| CELL B-4 | — | NON-EXISTENCE OF FAILURE |
| CELL B-5 | — | NON-EXISTENCE OF FAILURE |
| CELL C-5 | — | NON-EXISTENCE OF FAILURE |
| CELL D-6 | — | NON-EXISTENCE OF FAILURE |
| ... | — | NON-EXISTENCE OF FAILURE |
| CELL G-3 | — | NON-EXISTENCE OF FAILURE |

FIG. 27

WIRELESS BASE STATION DEVICE, WIRELESS SYSTEM, AND FAILURE DETECTION METHOD

CROSS-REFERENCE TO RELATED APPLICATIONS

This application is based upon and claims the benefit of priority of the prior Japanese Patent Application No. 2014-005355, filed on Jan. 15, 2014, the entire contents of which are incorporated herein by reference.

FIELD

This invention is related to a wireless base station device, a wireless system, and a failure detection method.

BACKGROUND

In a wireless system, a wireless base station device may be configured to detect a failure in the wireless base station device and transmit a failure detection alarm to a failure monitoring device. Maintenance personnel of the wireless system specify a wireless base station device in which the failure occurred in accordance with the failure detection alarm sent to the failure monitoring device and restore the failure of the wireless base station, thereby returning the wireless system to its normal operation.

However, when a failure occurs at a place other than failure occurrence routes assumed in advance, the wireless base station device may not detect the occurrence of the failure and the failure detection alarm may not be transmitted to the failure monitoring device. A failure which occurs but is not detected and for which a detection alarm is not transmitted is called a silent failure.

When a silent failure occurs, maintenance personnel are delayed in discovering the failure since the failure detection alarm is not transmitted to the failure monitoring device. As a result, the wireless system continues its operation in an abnormal state, and a problem such that a mobile terminal device cannot communicate with the wireless base station device may be caused in a communication service.

Note that the following technology for detecting a silent failure in which a wireless terminal fails to connect to a base station even when the wireless terminal can receive broadcast information from the base station as a result of the failure occurrence in a wireless communication function of the base station is known. Namely, after failing to connect to a first base station included in a first network, a wireless terminal transmits failure notification information indicating that it has failed to connect to the first base station to a second base station included in a second network that is different in access method from the first network. Upon receipt of the failure notification information from the wireless terminal, the second base station transmits alarm information to a specified network device. The specified network device detects the silent failure of the first base station in accordance with the alarm information from the second base station.

In addition, the following technology for preparing a failure occurrence area map which indicates an occurrence location of a communication failure is known. Namely, a position information acquisition unit of the base station periodically acquires position information of a wireless terminal. A position information memory unit stores the acquired position information in a memory device. A communication failure detection unit detects the communication failure of the wireless terminal. When a communication failure is detected, a transmission unit transmits, to an area map preparing device, area map preparing information including the latest position information stored in the memory device of the wireless terminal in which the communication failure is detected. A reception unit of the area map preparing device receives the area map preparing information including position information at the time when the communication failure occurs in the wireless terminal. The area map preparing unit plots the position information included in the received area map preparing information, thereby preparing the failure occurrence map which indicates the communication occurrence location.

Furthermore, the following technology for a mobile node to estimate a location of a communication failure in the case when communication with other mobile nodes ceases is known. That is, the mobile node is provided with an information acquisition unit to acquire its own location, a memory unit to store the position information acquired by the information acquisition unit and position information received from other mobile nodes for each mobile node, a wireless communication unit to transmit position information to other nodes, and a failure occurrence location estimation unit to estimate a location at which a communication failure occurred by using the position information stored in the memory unit when the communication with the other node wirelessly connected to itself ceases.

PRIOR ART PUBLICATION

Patent Publication

[Patent publication 1]: Japanese Laid-open Patent Publication 2012-124707
[Patent publication 2]: Japanese Laid-open Patent Publication 2011-119976
[Patent publication 3]: Japanese Laid-open Patent Publication 2009-147462

SUMMARY

According to an aspect of the embodiments, a wireless base station device includes a broadcast signal transmission unit, a measurement signal communication unit, a failure detection processing unit, and an alarm signal transmission unit. The broadcast signal transmission unit is configured to transmit a broadcast signal to a cell corresponding to the wireless base station device. The measurement signal communication unit is configured to transmit to a mobile terminal device existing in the cell a measurement instruction signal for instructing to perform a measurement of a wireless quality of the broadcast signal transmitted by the broadcast signal transmission unit and to receive a measurement report signal for reporting the measurement of the wireless quality for the cell from the mobile terminal device. The failure detection processing unit is configured to detect a failure of a first cell with respect to a transmission function from the wireless base station to the first cell in accordance with whether a measurement report signal including a measurement report of a wireless quality for a second cell measured by a mobile terminal device existing in a coverage area of the first cell is received or not when a measurement report of a wireless quality for the first cell is not included in the measurement report signal received by the measurement signal communication unit. The alarm signal transmission unit is configured to receive from the failure detection processing unit a notification of the first cell in which a failure is detected when the failure of the first cell is detected by the failure detection processing unit and to transmit an alarm signal to notify a failure monitoring device of an occurrence of the failure of the first cell.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 1 is an exemplary configuration diagram of a wireless system in accordance with the first embodiment;

FIG. 3 is an exemplary configuration diagram of a wireless base station device in accordance with the first embodiment;

FIG. 4 is an exemplary configuration diagram of a call-process monitoring and control unit in accordance with the first embodiment;

FIG. 5 is an exemplary arrangement diagram of wireless base station devices;

FIG. 6 is an exemplary diagram of a report management table;

FIG. 7 is the first exemplary diagram of coordinate mesh numbers allocated to peripheral sections of a wireless base station device;

FIG. 8 is an exemplary diagram of a measurement report signal;

FIG. 9 is an exemplary flow chart of a measurement report recording process executed by a position coordinate conversion unit;

FIG. 10 is an exemplary diagram of a report management table at the completion of a monitoring period timer;

FIG. 12A is an exemplary flow chart of a failure detection process executed by a failure detection processing unit in accordance with the first embodiment;

FIG. 13 is an exemplary diagram of a report management table in which a coverage area is recorded;

FIG. 14 is the first exemplary diagram of a cell state table;

FIG. 15 is an exemplary configuration diagram of a wireless base station device in accordance with the second embodiment;

FIG. 17 is an exemplary diagram of a coverage area table;

FIG. 18 is an exemplary diagram of a coverage rate table;

FIG. 19 is the second exemplary diagram of coordinate mesh numbers allocated to peripheral sections of a wireless base station device;

FIG. 20A is an exemplary flow chart of a failure detection process executed by a failure detection processing unit in accordance with the second embodiment;

FIG. 21 is an exemplary diagram of a coverage area table in which registration is processed;

FIG. 22 is an exemplary diagram of a coverage rate table in which registration is processed;

FIG. 23 is an exemplary diagram of a coverage area table at a certain timing;

FIG. 24 is an exemplary diagram of a coverage rate table at a certain timing;

FIG. 25 is an exemplary diagram of a coverage area table in which deletion process is executed;

FIG. 26 is an exemplary diagram of a coverage rate table in which deletion process is executed; and FIG. 27 is the second exemplary diagram of the cell state table.

DESCRIPTION OF EMBODIMENTS

Figure 2:
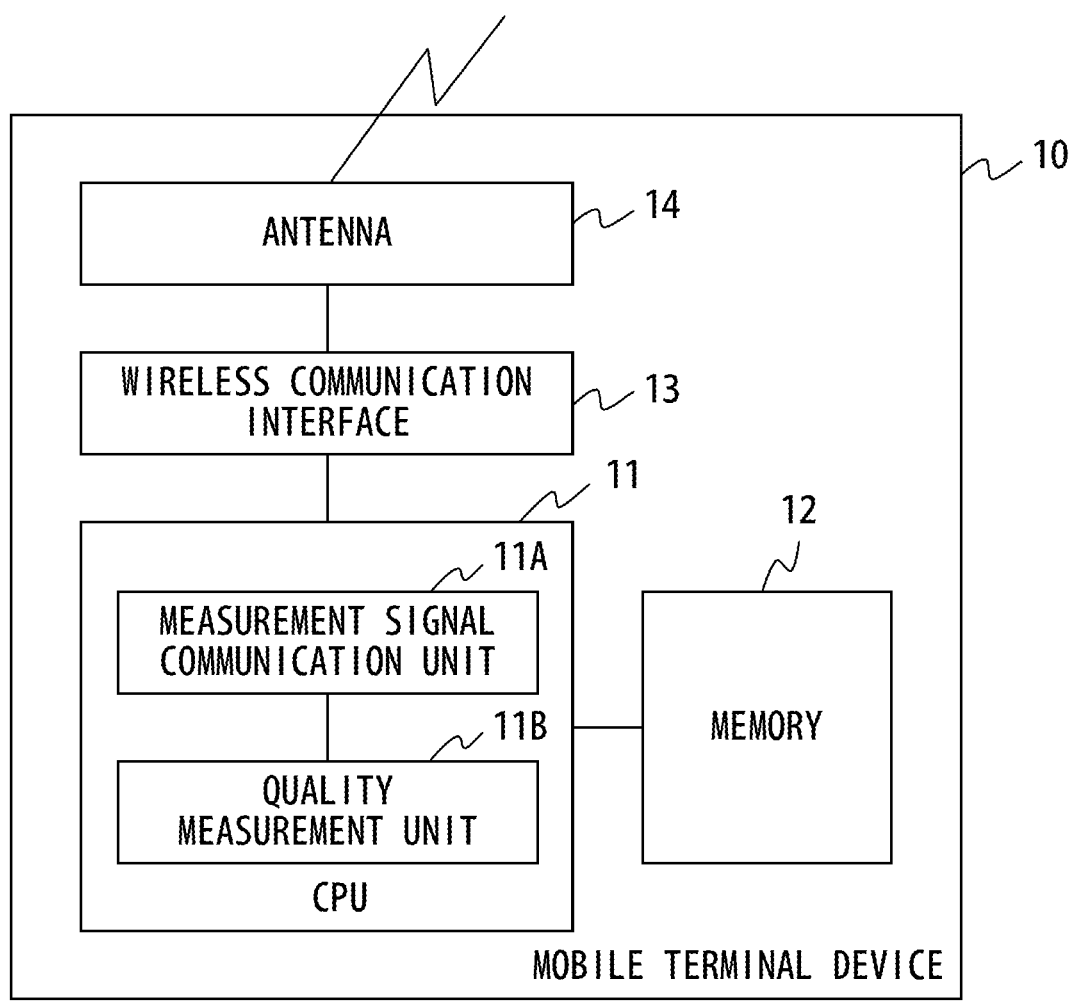
FIG. 2 is an exemplary configuration diagram of a mobile terminal device in accordance with the first embodiment.

Embodiments to carry out the invention will be described below with reference to the attached drawings.

First Embodiment

FIG. 1 is an exemplary configuration diagram of a wireless system in accordance with the first embodiment. As illustrated in FIG. 1, a wireless system 1 includes mobile terminal devices 10-1 through 10-8, wireless base station devices 20-1 through 20-4, core network devices 30-1 and 30-2, and a failure monitoring device 40. In the description set forth below, when mobile terminal devices 10-1 through 10-8 are respectively not particularly distinguished, then they each denote mobile terminal devices 10. When wireless base station devices 20-1 through 20-4 are respectively not particularly distinguished, then they denote wireless base station devices 20. When core network devices 30-1 and 30-2 are respectively not particularly distinguished, then they denote core network devices 30.

The mobile terminal device 10 exists in a cell that is a communication section covered by the wireless base station device 20, and communicates wirelessly with the wireless base station device 20 corresponding to the cell in which the mobile terminal device 10 exists. The mobile terminal device 10 is User Equipment (UE) prescribed in specifications of the Third Generation Partnership Project (3GPP), for example, and includes a cellular telephone called as a smart-phone and a wireless communication terminal device called as a tablet terminal. Although eight mobile terminal devices 10 are illustrated in FIG. 1, the number of mobile terminal devices 10 included in the wireless system 1 may be any number.

The wireless base station device 20 communicates wirelessly with the mobile terminal device 10 existing in a cell corresponding to the wireless base station device 20. Although each wireless base station device 20 is wirelessly connected to two mobile terminal devices 10 in the example illustrated in FIG. 1, the number of mobile terminal devices 10 wirelessly connected to the wireless base station devices 20 may be any number. The wireless base station device 20 connects the core network device 30 via a first Internet Protocol (IP) interface such as an S1 interface. In addition, the wireless base station device 20 connects to other peripheral wireless base station devices 20 via a second IP interface such as an X2 interface. The wireless base station device 20 is an evolved Node B (eNB) prescribed in the specifications of the 3GPP, for example. Although four wireless base station devices 20 are illustrated in FIG. 1, the number of the wireless base station devices 20 included in the wires system 1 may be any number.

The core network device 30 is a device included in a core network which connects a wireless access network including the wireless base station device 20 with an external network (not illustrated) such as the Internet. The core network is an Evolved Packet Core (EPC) prescribed in the specifications of the 3GPP, for example. The core network device 30 is a Mobility Management Entity (MME) that contains the controlled wireless base station devices 20 and carries out mobility control or a System Architecture Evolution Gateway (SAG-GW) that makes a routing for user packets or the like, for example. The core network device 30 connects the controlled wireless base station device 20 via the first IP interface such as the S1 interface. Although each core network device 30 is connected to two wireless base station devices 20 in the example illustrated in FIG. 1, the number of the wireless base station devices 20 to which the core network device 30 may be connected may be any number. Further, although two core network devices 30 are illustrated in FIG. 1, the number of the core network devices 30 included in the wireless system may be any number.

The failure monitoring device 40 is a device configured to monitor a failure occurring in the wireless base station device 20. The failure monitoring device 40 connects with the core network device 30. The failure monitoring device 40 receives an alarm signal transmitted from the wireless base station device 20 in which a failure occurs, via the core network device 30. The failure monitoring device 40 may be an information processing device such as a computer.

The wireless base station device 20 is configured to detect a failure occurring in the wireless base station device 20 and to transmit an alarm signal for informing the occurrence of the failure to the failure monitoring device 40. However, when a failure occurs in a transmission function from the wireless base station device 20 to a cell corresponding to the wireless base station device 20, the failure might become a silent failure for which an alarm signal is not transmitted.

By way of example, a signal is transmitted and received between a wireless base station device 20 and a mobile terminal device 10 connected to the wireless base station device 20 as follows. That is, the wireless base station device 20 transmits a measurement instruction signal to the mobile terminal device 10 connected to the wireless base station device 20. The measurement instruction signal is a signal for instructing the mobile terminal device 10 to measure a wireless quality of a broadcast signal transmitted by each wireless base station device 20 to the corresponding cell. The measurement instruction signal is a measurement control message prescribed in the specifications of the 3GPP, for example. The mobile terminal device 10 receives the measurement instruction signal transmitted from the wireless base station device 20. The mobile terminal device 10 measures the wireless quality of the broadcast signal in accordance with the received measurement instruction signal. That is, the mobile terminal device 10 receives a broadcast signal transmitted from the wireless base station device 20 which is connected to the mobile terminal device 10 and a broadcast signal transmitted from a peripheral wireless base station device 20 in a position where the mobile terminal device 10 exists, and measures the wireless quality of each received broadcast signal. The wireless quality to be measured is, for example, a reception electric field intensity of the broadcast signal. The mobile terminal device 10 transmits a measurement report signal to notify the wireless base station device 20 connected to the mobile terminal device 10 of the measured wireless quality of each of the broadcast signals. The measurement report signal transmitted from the mobile terminal device 10 to the wireless base station device 20 is a Measurement Report message prescribed in the 3GPP, for example.

When some failure occurs in the transmission function from the wireless base station device 20 to a cell corresponding to the wireless base station device 20, a radio wave including a broadcast signal and a measurement instruction signal is not transmitted to the cell. Therefore, the mobile terminal device 10 does not measure wireless quality for the cell to which the radio wave is not transmitted, and does not reports the measurement result. Hence, a measurement report signal received by the wireless base station device 20 does not include a wireless quality of the cell to which the radio wave is not transmitted.

In this way, when a failure occurs in the transmission function from the wireless base station device 20 to the corresponding cell, a measurement report signal received by the wireless base station device 20 does not include wireless quality information of a cell to which a radio wave is not transmitted. However, the cause of not including the wireless quality of the cell corresponding to the wireless base station device 20 in the measurement report signal received by the wireless base station device 20 is not limited to the failure occurrence of the transmission function of the wireless base station device 20 corresponding to the cell. For example, in the case when a failure occurs in a reception function of the mobile terminal device 10 or even in the case when the wireless environment between the mobile terminal device 10 and the wireless base station device 20 become temporarily bad due to rainfall or the like, a measurement report signal received by the wireless base station device 20 does not include the wireless quality of the cell. In these cases, although no failure occurs in the wireless base station device 20, the measurement report signal received by the wireless base station device 20 does not include the wireless quality of the cell. Hence, it may not be identified whether a reason that does not include the wireless quality of the cell corresponding to the wireless base station device 20 in the measurement report signal received by the wireless base station device 20 is attributed to the occurrence of a failure in the transmission function of the wireless base station device 20 corresponding to the cell or some other causes. Namely, there is a risk that the failure of a transmission function from a wireless base station device 20 to a corresponding cell might be a silent failure.

Thus, a wireless base station device 20 in accordance with the first embodiment is configured to detect a failure that occurred in a transmission function from the wireless base station device 20 to the corresponding cell without deeming the failure to be a silent failure. For example, when the wireless base station device 20 determines that a measurement report signal including a measurement report of the wireless quality for the second cell, which is measured by a mobile terminal device 10 existing in a coverage area of the first cell, is received in the case where the measurement report of the wireless quality for the first cell is not included in the received measurement report signal, the wireless base station device 20 detects a failure for the first cell.

The exemplary configuration of a mobile terminal device 10 which communicates with a wireless base station device 20 in accordance with the first embodiment will be described as follows. FIG. 2 is an exemplary configuration diagram of a mobile terminal device in accordance with the first embodiment. As illustrated in FIG. 2, the mobile terminal device 10 includes a central processing unit (CPU) 11, a memory 12, a wireless communication interface 13, and an antenna 14.

The CPU 11 is a logic circuit configured to execute an arithmetic process. The CPU 11 controls an entire operation of the mobile terminal device 10. The memory 12 stores programs and data executed by the CPU 11 and data being processed by the CPU 11. The CPU 11 includes a measurement signal communication unit 11A and a quality measurement unit 11B.

The measurement signal communication unit 11A receives a broadcast signal transmitted from the wireless base station device 20 via the antenna 14 and the wireless communication interface 13. The received broadcast signal may include a broadcast signal of each cell corresponding to the wireless base station device 20 connected to the mobile terminal device 10 and a broadcast signal of each of cells corresponding to wireless base station devices 20 in a periphery of the location where the mobile terminal device 10 exists. Further, the measurement signal communication unit 11A receives a measurement instruction signal transmitted from the wireless base station device 20 connected to the mobile terminal device 10 via the antenna 14 and the wireless communication interface 13.

The quality measurement unit 11B measures the wireless quality of a broadcast signal received by the measurement signal communication unit 11A in accordance with the measurement instruction signal received by the measurement signal communication unit 11A. The wireless quality to be measured is reception electric field intensity of the broadcast signal, for example. The measurement signal communication unit 11A generates a measurement report signal which includes wireless quality information indicating the wireless quality of the broadcast signal measured by the quality measurement unit 11B and position information indicating a location of the mobile terminal device 10 that measured the wireless quality. The measurement signal communication unit 11A transmits the generated measurement report signal to the wireless base station device 20 connected to the mobile terminal device 10 via the wireless communication interface 13 and the antenna 14.

The wireless communication interface 13 receives a signal which is addressed to a wireless base station device 20 and which is transmitted from CPU 11, carries out baseband processing and wireless signal processing of the received signal, and transmits the processed wireless signal via the antenna 14. Further, the wireless communication interface 13 receives a wireless signal transmitted from a wireless base station device 20 via the antenna 14, carries out baseband processing and wireless signal processing of the received signal, and transmits the processed wireless signal to the CPU 11.

Next, the configuration of the wireless base station device 20 in accordance with the first embodiment will be described. FIG. 3 is an exemplary configuration diagram of a wireless base station device 20 in accordance with the first embodiment. As illustrated in FIG. 3, the wireless base station device 20 includes a CPU 21, a memory 22, a wireless communication interface 23, an antenna 24, and a network interface 25.

The CPU 21 is a logic circuit configured to execute an arithmetic process. The CPU 21 controls an entire operation of the wireless base station device 20. The CPU 21 includes a call-process monitoring and control unit 21A. The call-process monitoring and control unit 21A processes transmission and reception signals exchanged between a mobile terminal device 10 requesting to connect to the wireless base station device 20 and the wireless base station device 20, transmission and reception signals exchanged in response to a call to the mobile terminal device 10 existing in a cell formed by the wireless base station device 20, etc. Further, the call-process monitoring and control unit 21A monitors the occurrence of a failure in the wireless base station device 20.

The memory 22 stores programs and data executed by the CPU 21 and data being processed by the CPU 21. Further, the memory 22 includes a report management table 22A and a cell state table 22B. The report management table 22A is a table to record for each cell whether a measurement report signal received by the wireless base station device 20 includes a measurement report of the wireless quality for the cell. The cell state table 22B is a table to record an operation state of each cell and whether or not a failure has occurred in each cell.

The wireless communication interface 23 receives a signal which is addressed to a mobile terminal device 10 and which is transmitted from the CPU 21, carries out base-band processing and wireless signal processing of the received signal, and transmits the processed wireless signal via the antenna 24. Further, the wireless communication interface 23 receives a wireless signal transmitted from a mobile terminal device 10 via the antenna 24, carries out wireless signal processing and base-band processing of the received signal, and transmits the processed wireless signal to the CPU 21.

The network interface 25 provides the first IP interface, such as an S1 interface, and the second IP interface, such as an X2 interface. The network interface 25 receives an IP packet transmitted from a core network device 30 or the other peripheral wireless base station device 20 and transmits to the CPU 21 a data signal in which the received IP packet is processed. Further, the network interface 25 receives a data signal which is addressed to a core network device 30 or the other peripheral wireless base station device 20 and which is transmitted from the CPU 21, and transmits an IP packet signal in which the received signal is processed to an addressed device.

FIG. 4 is an exemplary configuration diagram of a call-process monitoring and control unit in accordance with the first embodiment. As illustrated in FIG. 4, the call-process monitoring and control unit 21A includes a cell management unit 210, a call processing unit 211, a broadcast signal transmission unit 212, a measurement signal communication unit 213, and a communication unit for mobile terminal device 214. Further, the call-process monitoring and control unit 21A includes a position coordinate conversion unit 215, a failure detection processing unit 216, a timer management unit 217, an alarm signal transmission unit 218, and a communication unit for other node 219.

The cell management unit 210 manages an operation of each cell which is a communication section covered by the wireless base station device 20. The cell management unit 210 receives from a failure detection processing unit 216 a notification that a failure has been detected in a cell managed by the cell management unit 210, and instructs the call processing unit 211 to execute the initialization process for a cell for which a failure is detected in accordance with the received notification.

The call processing unit 211 processes a signal used for communicating with a mobile terminal device 10 existing in a cell, the operation of which is managed by the cell management unit 210. Further, the call processing unit 211 executes the initialization process of a cell for which a failure is detected in accordance with an instruction of the cell management unit 210, and executes recovery process for the cell for which the failure is detected. Further, the call processing unit 211 executes the initialization process for a cell for which a failure is detected in accordance with an alarm signal transmitted from the other wireless base station device 20 and executes recovery process for the cell for which the failure is detected.

The broadcast signal transmission unit 212 transmits a broadcast signal including broadcast information of the cell determined by the call processing unit 211, to the corresponding cell via the communication unit for mobile terminal device 214. The broadcast signal is a pilot signal such as a Downlink Reference Signal prescribed in the 3GPP, for example. The broadcast information may include a cell identifier (ID) of the cell, an operation parameter commonly desired for communication with all mobile terminal devices 10 in the cell.

The measurement signal communication unit 213 transmits to, and receives from, a mobile terminal device 10 a signal for the measurement and reporting of the wireless quality of a cell corresponding to the wireless base station device 20 and the wireless quality of a cell corresponding to the other peripheral wireless base station device 20.

Specifically, the measurement signal communication unit 213 transmits the measurement instruction signal to a mobile terminal device 10 connected to the wireless base station device 20 via the communication unit for mobile terminal device 214. The measurement signal communication unit 213 receives the measurement report signal transmitted from the mobile terminal device 10 via the communication unit for mobile terminal device 214. The received measurement report signal includes position information indicating the location in which the mobile terminal device 10 measured the wireless quality. In addition, the received measurement report signal may include wireless quality information of the cell corresponding to the wireless base station device 20, and wireless quality information of the cell corresponding to the peripheral wireless bases station devices 20.

The communication unit for mobile terminal device 214 confirms a content and format of a signal communicated with a mobile terminal device 10 and transfers the confirmed signal. The communication unit for mobile terminal device 214 receives a broadcast signal transmitted from the broadcast signal transmission unit 212 and a measurement instruction signal transmitted from the measurement signal communication unit 213, for example. The communication unit for mobile terminal device 214 confirms that the format of the received signal is a correct format and transmits the received signal to the wireless communication interface 23. Further, the communication unit for mobile terminal device 214 receives a measurement report signal transmitted from the wireless communication interface 23. The communication unit for mobile terminal device 214 confirms that the format of the received measurement report signal is a correct format and transmits the received measurement report signal to the measurement signal communication unit 213.

The position coordinate conversion unit 215 extracts a position of a mobile terminal device 10 that transmitted the measurement report signal from position information included in the measurement report signal received by the measurement signal communication unit 213. The position coordinate conversion unit 215 converts a position to which the measurement report signal was transmitted into a divided section including the extracted position, among divided sections into which a peripheral area of a wireless base station device 20 is divided. Further, the position coordinate conversion unit 215 extracts a cell for which wireless quality is reported from a measurement report signal received by the measurement communication unit 213. The position coordinate conversion unit 215 makes the divided section where the position from which the measurement report signal is transmitted is converted and the extracted cell correspond to each other, and records them in the report management table 22A. As a result, a fact that the measurement report of the wireless quality for the cell has been performed in the divided section is recorded in the report management table 22A.

The timer management unit 217 manages a monitoring period timer for monitoring a failure that occurs in each cell corresponding to a wireless base station device 20 at a specified monitoring period. The timer management unit 217 notifies the failure detection processing unit 216 of the completion of the monitoring period timer when the monitoring period timer is completed. The timer management unit 217 restarts after the failure detection process is executed by the failure detection processing unit 216.

The failure detection processing unit 216 updates the report management table 22A after the completion of the monitoring period timer managed by the timer management unit 217. Further, the failure detection processing unit 216 determines whether or not a failure occurs in each cell using the updated report management table 22A and the cell state table 22B in which the operation state of each cell in the wireless base station device 20 and its peripheral wireless base station devices 20 is recorded. That is, the failure detection processing unit 216 detects a cell to which an radio wave including a broadcast signal and a measurement instruction signal is not transmitted from the wireless base station device 20 as the cell for which a failure has occurred.

Specifically, the failure detection processing unit 216 records all divided sections of the cell for which wireless qualities have been reported by each of measurement report signals received in a specified monitoring period, as a coverage area in which communication is covered by the cell. Further, the failure detection processing unit 216 excludes the divided section for which wireless quality has not been reported in a predetermined number of the consecutive monitoring periods from the coverage area of the cell among the divided sections recorded in the report management table 22A as the coverage area of the cell.

The failure detection processing unit 216 confirms whether wireless quality has been reported for each cell managed by the updated report management table 22A. With respect to a cell on which a report of wireless quality is confirmed, the failure detection processing unit 216 determines that there is no failure in the cell. With respect to a cell on which wireless quality is not reported, the failure detection processing unit 216 confirms whether or not all divided sections included in the coverage area of the cell are a divided section from which wireless quality has not been reported for any other cells managed by the report management table 2A.

When all of the divided sections included in the coverage area of the cell are a divided section from which the wireless quality has not been reported for any other cells, the failure detection processing unit 216 defers determining whether or not a failure occurs in the cell. A failure for the cell, of which the determination is deferred, may be detected by an alarm signal transmitted from other wireless base station devices 20. On the other hand, when at least a portion of divided sections included in the coverage area of the cell is a divided section from which wireless quality has been reported for at least a portion of the other cells, the failure detection processing unit 216 confirms whether or not an operation state of the cell is in operation or not with reference to the cell state table 22B.

When the operation state of the cell is confirmed to be under suspension, the failure detection processing unit 216 determines that there is no failure in the cell. When the operation state is confirmed to be in operation, the failure detection processing unit 216 determines that there is a failure in the cell.

The failure detection processing unit 216 notifies the alarm signal transmission unit 218 of the cell in which there is a failure. Further, the failure detection processing unit 216 notifies the cell management unit 210 of the cell corresponding to the wireless base station device 20 among the cells which is determined that there is a failure.

The alarm signal transmission unit 218 generates an alarm signal indicating that failure has occurred in the cell reported by the failure detection processing unit 216, and transmits the generated alarm to the failure monitoring device 40 via the communication unit for other node 219. Further, when the reported cell is a cell corresponding to the peripheral wireless base station device 20, the alarm signal transmission unit 218 transmits the generated alarm signal to the failure monitoring unit 40 as well as the wireless base station device 20 corresponding to the cell via the communication unit for other node 219.

The communication unit for other node 219 confirms a content and format of a signal for communicating with other wireless base station devices 20 or other nodes such as core networks, and transfers the confirmed signal. The communication unit for other node 219, for example, receives an alarm signal transmitted from the alarm signal transmission unit 218. The communication unit for other node 219 confirms that a format of the received signal is a correct format, and transmits the received alarm signal to the network interface 25. Further, the communication unit for other node 219 receives an alarm signal transmitted from the network interface 25. The communication unit for other node 219 confirms that a format of the received alarm signal is a correct format, and transmits the received alarm signal to the call processing unit 21.

An example of a failure detection method executed by the wireless base station device 20 will be described below. FIG. 5 is an exemplary arrangement diagram of wireless base station devices. The wireless base station devices 20A through 20G illustrated in FIG. 5 are wireless base station devices 20 in accordance with the first embodiment. Each of the wireless base station devices 20A through 20G has a communication area illustrated by an ellipse. Some parts of the communication areas of the wireless base station devices 20A through 20G may be overlapped with each other. The arrangement illustrated in FIG. 5 is just an example and the arrangement of each wireless base station device 20 may be arbitrary and the number of wireless base station devices 20 existing in the periphery of a certain wireless base station device 20 may be any number. Further, the shape of the communication area of each wireless base station device 20 may not be elliptical as illustrated in FIG. 5. A failure detection method carried out by the wireless base station device 20A as a concrete example will be described on the assumption hereinafter that the wireless base station devices 20B through 20G exist in the periphery of the wireless base station device 20A.

First, the wireless base station device 20 holds in advance a report management table 22A with a format illustrated in FIG. 6 in the memory 22. FIG. 6 is an exemplary diagram of a report management table. An example of the report management table 22A held in a memory 22 of the wireless base station device 20A is illustrated in FIG. 6. The report management table 22A in the example illustrated in FIG. 6 includes a cell number, an existence or non-existence of a report, a coordinate mesh number, and a coverage area as recording items.

The cell number is an identifier of each cell corresponding to the wireless base station device 20 and an identifier of each cell corresponding to a peripheral wireless base station device 20. In the example illustrated in FIG. 6, each cell number corresponding to the wireless base station device 20A and each cell number corresponding to each of the peripheral wireless base station devices 20B through 20G are registered in each line of a "cell number" field. Further, in the last line of the "cell number" field, "all cells", indicative of all of the cells registered in the report management table 22A, are registered.

Note that the cell number " . . . " described in FIG. 6 represents a certain cell number other than the cell numbers expressly set forth in FIG. 6.

The existence or non-existence of a report represents whether or not wireless quality information of a cell corresponding to the cell number is included in a received measurement report signal.

A coordinate mesh number represents an identification number of each divided section into which a peripheral area of the wireless base station device 20 is divided. FIG. 7 is a first exemplary diagram of coordinate mesh numbers allocated to peripheral sections of a wireless base station device. In the example illustrated in FIG. 7, the communication area of the wireless base station device 20A includes cell A-1 through cell A6. Parts of cell A-1 through cell A6 may be overlapped with each other. Further, in the example illustrated in FIG. 7, the peripheral area of the wireless base station device 20A, including the communication area of the wireless base station device 20A, is divided into 12 mesh-like divided sections by latitude and longitude, and proper coordinate mesh numbers 1 through 12 are each allocated to the divided sections. Thus, in the example illustrated in FIG. 6, each of coordinate mesh numbers 1 through 12 is registered in each row of a "coordinate mesh number" field of the report management table 22A. Note that the coordinate mesh number " . . . " specified in FIG. 6 is a certain mesh number other than the mesh numbers expressly specified in FIG. 6. Further, FIG. 7 is exemplified only for explanation and a method for the division of a peripheral area of the wireless base station device 20A and a method for the allocation of a coordinate number may be any method.

The coverage area represents a coverage area of the cell specified by each measurement report signal received before the current monitoring period. The coverage area is indicated by a coordinate mesh number of a divided section. Each divided section included in the coverage area is acquired in accordance with position information included in a measurement report signal when wireless quality information of the cell corresponding to the cell number is included in the received measurement report signal.

The report management table 22A as illustrated in FIG. 6 is initialized when a wireless base station device 20 is set, when the configuration of a cell corresponding to a wireless base station device 20 is changed, and when the configuration of a cell corresponding to a peripheral wireless base station device 20 is changed. A symbol "−" described in the report management table 22A illustrated in FIG. 6 represents an initial value. The initial value may be a numerical value "0", for example. The report management table 22A illustrated in FIG. 6 may be held in the memory 22 for each frequency which is used by a wireless base station device 20.

After the report management table 22A is held, the broadcast signal transmission unit 212 of the wireless base station device 20 transmits a broadcast signal to each cell corresponding to the wireless base station device 20. In the example illustrated in FIG. 7, the broadcast signal transmission unit 212 of the wireless base station device 20A transmits the broadcast signal to cell A-1 through cell A-6. Further, each broadcast signal transmission unit 212 of peripheral wireless base station devices 20B through 20G transmits the broadcast signal to each corresponding cell.

The timer management unit 217 starts a monitoring period timer. The measurement signal communication unit 213 transmits the measurement instruction signal to each cell corresponding to the wireless base station device 20. In the example illustrated in FIG. 7, the measurement signal communication unit 213 of the wireless base station device 20A transmits the measurement instruction signal to cell A-1 through cell A-6.

The measurement signal communication unit 213 receives the measurement report signal transmitted from the mobile terminal device 10 in accordance with the transmitted measurement instruction signal. As illustrated in an example of FIG. 8, position information and quality information of one or more cells are included in the received measurement report signal. FIG. 8 is an exemplary diagram of a measurement report signal. The position information included in the measurement report signal is information indicating a position of the mobile terminal device 10 that measured wireless quality, and includes a latitude and a longitude of the position where the mobile terminal device 10 exists, for example. Each piece of quality information included in the measurement report signal includes the wireless quality of the broadcast signal measured by the mobile terminal device 10 and a cell number (cell identifier) of a cell to which the broadcast signal is transmitted.

The position coordinate conversion unit 215 records a divided section in which wireless quality is measured and a cell for which wireless quality is measured in the report management table 22A using the measurement report signal received by the measurement signal communication unit 213. For example, the position coordinate conversion unit 215 carries out a recording process of the measurement report signal, i.e., a measurement report recording process in accordance with a process flow as illustrated in FIG. 9. FIG. 9 is an exemplary flow chart of a measurement report recording process executed by the position coordinate conversion unit.

When a series of measurement report recording processes are initiated (step S1001), the position coordinate conversion unit 215 specifies a position of a mobile terminal device 10 that transmitted the received measurement report signal in accordance with position information included in the received measurement report signal. Then, the position coordinate conversion unit 215 converts the position from which the received measurement report signal has been transmitted into a divided section including the specified position, and extracts a coordinate mesh number of the converted divided section (step S1002).

The position coordinate conversion unit 215 executes the repetitive process between step S1003 and step S1008 up to a frequency of the number of cells for which wireless quality has been reported by the received measurement report signal.

That is, the position coordinate conversion unit 215 extracts a cell number of the cell for which wireless quality has been reported by the received measurement report signal (step S1004). In the report management table 22A, the position coordinate conversion unit 215 sets a flag in the "existence or non-existence of a report" field corresponding to the extracted cell number. Setting the flag in the "existence or non-existence of a report" field indicates that the measurement report of wireless quality has been made for the broadcast signal transmitted to the cell, and also indicates that a radio wave such as the broadcast signal has been transmitted in the cell.

The position coordinate conversion unit 215 sets a flag in the "coordinate mesh number" field of the extracted coordinate mesh number among the "coordinate mesh number" fields corresponding to the extracted cell number (step S1006). Setting such a flag indicates that the wireless quality of the cell has been reported from the divided section of the coordinate mesh number, and also indicates that the broadcast signal transmitted to the cell has been received in the divided section of the coordinate mesh number.

The position coordinate conversion unit 215 sets a flag in the "coordinate mesh number" field of the extracted coordinate mesh number among the "coordinate mesh number" fields corresponding to "all cells" (step S1007). Setting such a flag indicates that the wireless quality of the broadcast signal transmitted to a specified cell among all of the cells managed by the report management table 22A has been reported from the divided section of the coordinate mesh number. In addition, setting such a flag indicates that communication performed by the mobile terminal device 10 such as the transmission of the measurement report signal exists in the section.

When the repetitive process between step S1003 and step S1008 is executed up to a frequency of the number of cells for which wireless quality has been reported by the received measurement report signal, a series of the measurement report recording processes are terminated (step S1009).

A series of the measurement report recording processes described with reference to FIG. 9 are executed whenever the measurement report signal transmitted from the mobile terminal device 10 is received. When the monitoring period timer is completed after the achievement of a specified monitoring period, the timer management unit 217 notifies the failure detection processing unit 216 of the completion of the monitoring period timer.

FIG. 10 is an example of a report management table at the completion of a monitoring period timer. In the example illustrated in FIG. 10, a symbol "o" recorded in the report management table 22A represents a flagged state, and the symbol may be a numerical value "1", for example. Further, a symbol "–" recorded in the report management table 22A represents an initial state, namely not-flagged state, and the symbol may be a numerical value "0", for example. Note that a cell number " . . . " described in FIG. 10 represents a certain cell number other than the cell numbers expressly illustrated in FIG. 10. Further, a coordinate mesh number " . . . " described in FIG. 10 represents a certain coordinate mesh number other than the coordinate mesh numbers expressly described in FIG. 10.

Figure 11:
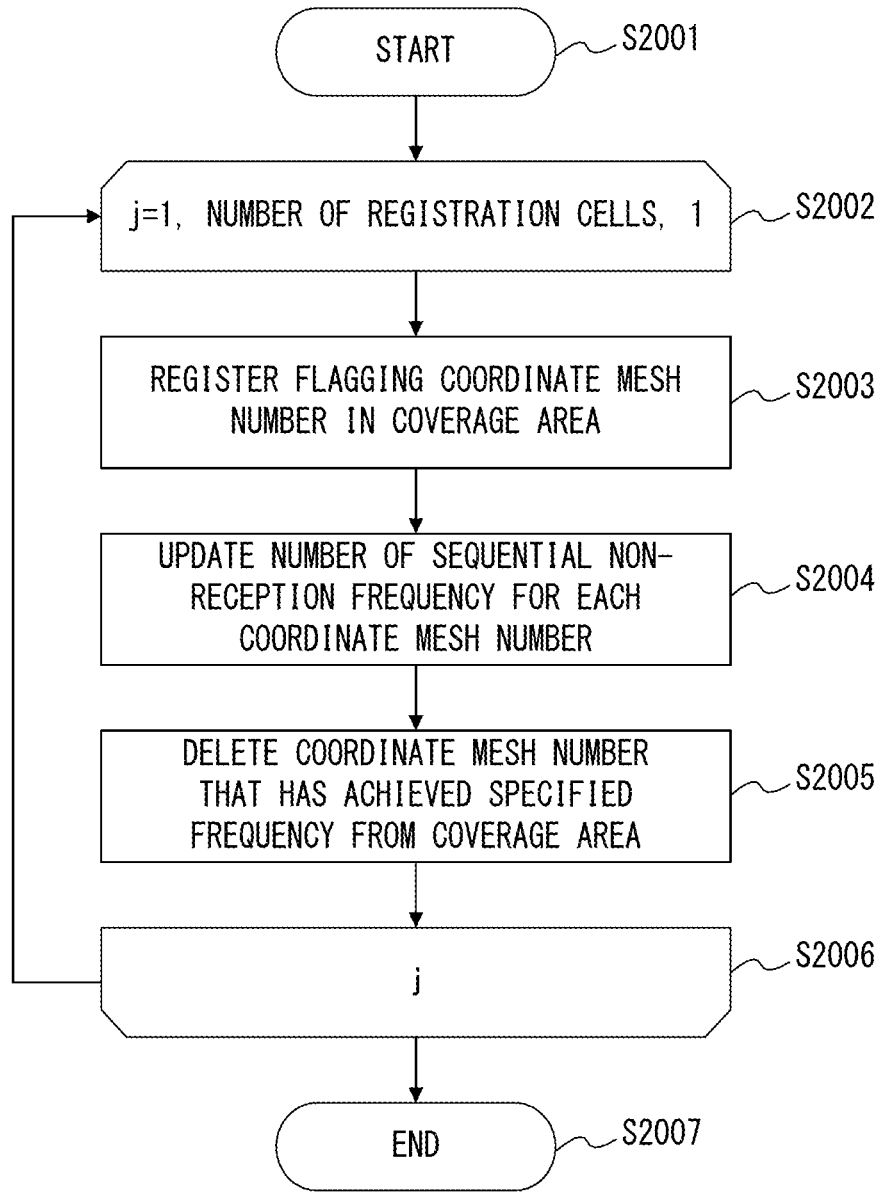
FIG. 11 is an exemplary flow chart of a coverage area recording process executed by a failure detection processing unit in accordance with the first embodiment.

The failure detection processing unit 216 records and updates a coverage area of each cell managed by the report management table 22A with reference to the report management table 22A in which the measurement report recording process has been carried out by the position coordinate conversion unit 215. For example, the failure detection processing unit 216 carries out recording and updating process, i.e., the coverage area recording process in accordance with a process flow illustrated in FIG. 11. FIG. 11 is an exemplary flow chart of a coverage area recording process executed by a failure detection processing unit in accordance with the first embodiment.

When the monitoring period timer is completed and a series of the coverage record processes are initiated (step S2001), the failure detection processing unit 216 carries out a repetitive process between step S2002 and step S2006 up to a frequency of the number of cells registered in the report management table 22A.

Namely, the failure detection processing unit 216 records a divided section of the coordinate mesh numbers for which the flag is set as a coverage area of the cell of the cell number (step S2003). As described above, the flag set in the "coordinate mesh number" field indicates that the wireless quality of the cell has been reported from the divided section of the coordinate mesh number, i.e., that the broadcast signal transmitted to the cell has been received in the divided section of the coordinate mesh number. For example, the flag indicated by a symbol "o" in an example illustrated in FIG. 10 is set for the coordinate mesh numbers 1, 2, 3 and "..." corresponding to the cell A-1. The failure detection processing unit 216 then records the divided sections of the coordinate mesh numbers 1, 2, 3 and "..." as a coverage area of the cell A-1. That is, the failure detection processing unit 216 records the coordinate mesh numbers 1, 2, 3 and "..." in the "coverage area" field corresponding to the cell A-1.

The failure detection processing unit 216 increments a count value for counting a non-reception of report for divided section from which wireless quality has not been reported in the monitoring period, i.e., the divided section of coordinate mesh number for which the flag is not set (step S2004). Then, the failure detection processing unit 216 excludes from the coverage area of the cell the divided section from which wireless quality has not been reported in a predetermined number of the consecutive monitoring periods, i.e., the divided section for which the count value has achieved a specified count value (step S2005), among the divided sections already recorded as a coverage area of the cell. For example, it is assumed that the flag for the coordinate mesh number 1 has not been set in a predetermined number of the consecutive monitoring periods among the coordinate mesh numbers 1, 2, 3 and "..." that have been already recorded in the "coverage area" field corresponding to the cell A-1 and the count value for the coordinate mesh number 1 has achieved a specified value. In the case of this assumption, the failure detection processing unit 216 excludes the coordinate mesh number 1 from the "coverage area" field corresponding to the cell A-1. Note that the count value for each of coordinate mesh numbers is initialized to be 0 (zero) when the flag is set for the coordinate mesh number.

When the repetitive process between step S2002 and step S2006 is executed up to a frequency of the number of cells registered in the report management table 22A, a series of the coverage area recording processes are terminated (step S2007).

Figure 12B:
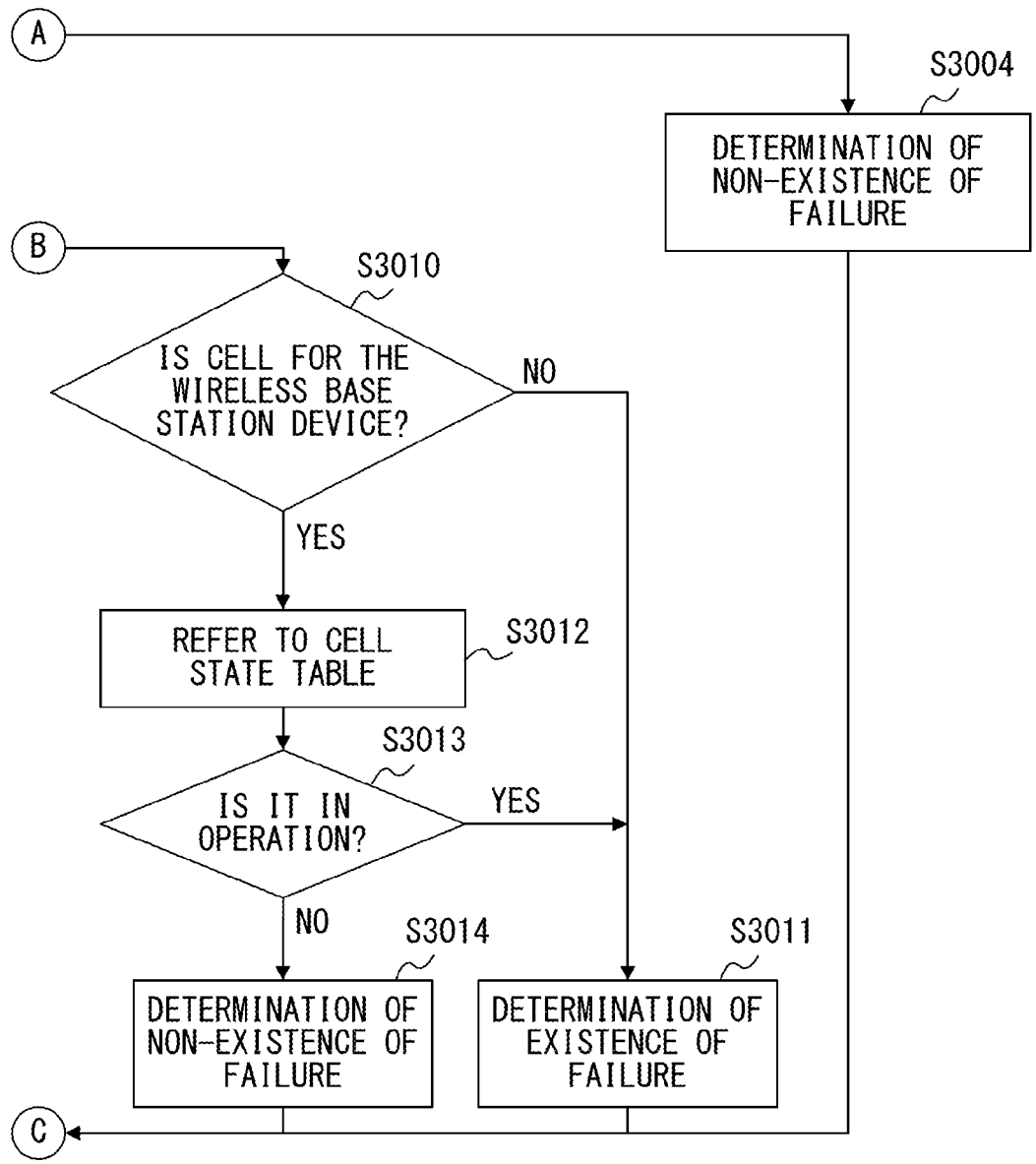
FIG. 12B is an exemplary flow chart of a failure detection process executed by a failure detection processing unit in accordance with the first embodiment.

When a series of the coverage area recording processes are terminated, the failure detection processing unit 216 detects an existence or non-existence of a failure occurrence of each cell registered in the report management table 22A with reference to the report management table 22A in which the coverage areas are recorded and updated. For example, the failure detection processing unit 216 executes a process for detecting an existence or non-existence of a failure occurrence of each cell, i.e., a failure detection process in accordance with a process flow as illustrated in FIG. 12A and FIG. 12B. FIG. 12A and FIG. 12B are an exemplary flow chart of a failure detection process executed by a failure detection processing unit in accordance with the first embodiment.

When a series of the failure detection processes are initiated (step S3001), the failure detection processing unit 216 executes a repetitive process between step S3002 and step S3016 up to a frequency of the number of cells registered in the report management table 22A.

Namely, the failure detection processing unit 216 determines whether or not the flag is set in the "existence or non-existence of a report" field corresponding to a cell number of the cell (step S3003). As described above, the flag in the "existence or non-existence of a report" field indicates that a measurement report of wireless quality for the broadcast signal transmitted to a cell of the cell number exists, i.e., that a radio wave such as a broadcast signal has been transmitted in the cell.

When it is determined that the flag is set in the "existence or non-existence of a report" field ("YES" in step S3003), the failure detection processing unit 216 determines that there is no failure in the cell of the cell number (step S3004). For example, it is assumed that the report management table 22A in which coverage area recording process has been made in a certain monitoring period is recorded as shown in FIG. 13. FIG. 13 is an exemplary diagram of a report management table in which a coverage area is recorded. In the example illustrated in FIG. 13, the failure detection processing unit 216 determines that there is no failure in cell A-2, cell A-5, cell A-6, cell B-4, cell C-5, cell D-6, cell "..." and cell G-3.

When it is determined that the flag is not set in the "existence and non-existence" field corresponding to the cell number ("NO" in step S3003), the failure detection processing unit 216 extracts a coordinate mesh number from the "coverage area" field corresponding to the cell number (step S3005). The coordinate mesh number described in the "coverage area" field represents a divided section from which the wireless quality of a cell of the cell number is reported by the measurement report signal transmitted by a mobile terminal device 10.

The failure detection processing unit 216 executes a repetitive process between step S3006 and step S3008 up to a frequency of the number of the extracted coordinate mesh numbers. That is, the failure detection processing unit 216 determines whether or not the flag is set in the "coordinate mesh number" field of the extracted coordinate mesh number among the "coordinate mesh number" fields corresponding to "all cells" (step S3007). As described above, the flag set in the "coordinate mesh number" field corresponding to "all cells" represents that the wireless quality of the broadcast signal transmitted to a certain cell has been reported from a divided section of the coordinate mesh number in all of the cells managed by the report management table 22A. In addition, the flag set in the "coordinate mesh number" field corresponding to "all cells" represents that communication by the mobile terminal device 10 such as the transmission of the measurement report signal exists in the section.

When it is determined that the flag is not set in the "coordinate mesh number" field for the extracted coordinate mesh number ("NO" in step S3007), the failure detection processing unit 216 repeats the determination process in step S3007 for the extracted next coordinate mesh number.

When the determination process in step S3007 is repeated for all of the extracted coordinate mesh numbers and it is determined that the flag is not set in all of the extracted coordinate mesh numbers, the failure detection processing unit 216 determines that data have not been acquired for the cell of the cell number (step S3009). That is, the failure detection processing unit 216 determines that no communication by a mobile terminal device 10 exists in the cell of the cell number in the monitoring period during which a series of the failure detection processes have been executed, and defers the determination of whether or not a failure has occurred in the cell of the cell number.

In an example illustrated in FIG. 13, the coverage area of cell number A-4 is a divided section of coordinate mesh number 4. Then, the failure detection processing unit 216 determines whether or not the flag is set in the coordinate mesh number 4 corresponding to "all cells". In the example illustrated in FIG. 13, a symbol "–" which represents the flag is not set is recorded in the coordinate mesh number 4. Thus, the failure detection processing unit 216 determines that no data has been acquired for the cell of the cell number A-4 and defers determining whether or not a failure has occurred in the cell of the cell number 4.

On the other hand, when it is determined that the flag is set in the extracted coordinate mesh number ("YES" in step S3007), the failure detection processing unit 216 determines whether or not the cell of the cell number is a cell corresponding to the wireless base station device 20 executing the failure detection process (step S3010). In the example illustrated in FIG. 13, the failure detection processing unit 216 determines whether or not the cell of the cell number is any one of cells A-1 through A-6 corresponding to the wireless base station device 20A.

When it is determined that the cell of the cell number is not the cell corresponding to the wireless base station device 20A executing the failure detection process ("NO" in step S3010), the failure detection processing unit 216 determines that there is a failure in the cell of the cell number (step S3011). The wireless base station device 20 that executes the failure detection process does not grasp an operation state of each cell corresponding to other wireless base station device 20. Thus, the failure detection processing unit 216 deems that each cell corresponding to the other wireless base station device 20 is in operation and determines that there is a failure in a cell for which the wireless quality has not been reported from a divided section recorded as a coverage area in spite of being in operation. In the example illustrated in FIG. 13, the failure detection processing unit 216 determines that there is a failure in cell B-5.

When it is determined that the cell of the cell number is a cell corresponding to the wireless base station device 20A executing the failure detection process ("YES" in step S3010), the failure detection processing unit 216 refers to an operation state of the cell in the cell state table 22B (step S3012). The failure detection processing unit 216 then determines whether the operation state of the cell is in operation or not (step S3013).

FIG. 14 is a first example diagram of a cell state table. As illustrated in FIG. 14, an operation state of each cell registered in the report management table 22A is recorded in the cell state table 22B. The operation state to be recorded may include an in-operation state, a wave-stopped state, and an unclear state. The wave-stopped state includes a maintenance state of the cell and a failed state of the cell. Since the wireless base station device 20 that executes the failure detection process may grasp an operation state for each cell corresponding to the wireless base station device 20, the in-operation state or the wave-stopped state is recorded as an operation state for each cell corresponding to the wireless base station device 20. On the other hand, since the wireless base station device 20 does not grasp an operation state for each cell corresponding to the other wireless base station device 20, the unclear state which is represented by such as a symbol "−" illustrated in FIG. 14 is recorded as an operation state for each cell corresponding to the other wireless base station device 20.

When it is determined that an operation state of the cell is not the in-operation state ("NO" in step S3013), the failure detection processing unit 216 determines that no failure has occurred in the cell (step S3014). In the example illustrated in FIG. 13, the failure detection processing unit 216 determines that no failure has occurred in the cell A-3.

When it is determined that an operation state of the cell is the in-operation state ("YES" in step S3013), the failure detection processing unit 216 determines that a failure has occurred in the cell (step S3011). In the example illustrated in FIG. 13, the failure detection processing unit 216 determines that a failure has occurred in the cell A-1.

The failure detection processing unit 216 records a failure determination result in step S3004, step S3011 or step S3014 in the cell state table 22B as illustrated by way of example in FIG. 14 (step S3015). When the repetitive process between step S3002 and step S3016 is then executed up to a frequency of the number of cells registered in the report management table 22A, a series of the failure detection processes are terminated (step S3017).

The failure detection processing unit 216 notifies the alarm signal transmission unit 218 of the cell in which it is determined that a failure has occurred. In addition, the failure detection processing unit 216 notifies the cell management unit 210 of the cell in which it is determined that a failure has occurred among the cells corresponding to the wireless base station devices 20. In the example illustrated in FIG. 14, the failure detection processing unit 216 notifies the alarm signal transmission unit 218 of cell A-1 and cell B-5 in which it is determined that a failure has occurred, and notifies the cell management unit 210 of the cell A-1 in which it is determined that a failure has occurred.

After the cell in which it is determined that a failure has occurred is reported, the failure detection processing unit 216 initializes all of the "existence or non-existence of a report" field and the "coordinate mesh number" field in the report management table 22A. Further, the failure detection processing unit 216 notifies the timer management unit 217 of the completion of the failure detection process. After receiving the notification, the timer management unit 217 resets the monitoring period timer and starts the monitoring period timer again.

The alarm signal transmission unit 218 generates an alarm signal indicating that a failure has been detected in the cell reported by the failure detection processing unit 216 and transmits the generated alarm signal to the failure monitoring device 40. The alarm signal transmitted from the alarm signal transmission unit 218 is transmitted to the failure monitoring device 40 via the first IP interface such as an S1 interface provided by the network interface 25. In the example illustrated in FIG. 14, the alarm signal transmission unit 218 generates alarm signals for the cell A-1 and the cell B-1, respectively, and transmits each generated alarm signal to the failure monitoring device 40.

Further, the alarm signal transmission unit 218 transmits to the other wireless base station device 20 an alarm signal for a cell corresponding to the other wireless base station device 20 among the cells reported by the failure detection processing unit 216. That is, the alarm signal transmitted from the alarm signal transmission unit 218 is transmitted to the other wireless base station device 20 via a second IP interface such as an X2 interface provided by the network interface 25. In the example illustrated in FIG. 14, the alarm signal transmission unit 218 transmits the alarm signal for cell B-5 to the wireless base station device 20B (FIG. 5) corresponding to the cell B-5.

The cell management unit 210 instructs the call processing unit 211 to execute a resetting process of the cell reported by the failure detection processing unit 216. In the example illustrated in FIG. 14, the cell management unit 210 instructs the call processing unit 211 to perform a resetting process for the cell A-1.

The call processing unit 211 executes the resetting process of the cell designated by the cell management unit 210. Further, when an alarm signal is received for a cell for which the result of the failure determination recorded in the cell state table 22B indicates that data has not been acquired until the next monitoring period timer terminates, the call processing unit 211 executes the resetting process for a cell indicated by the received alarm signal. In the example illustrated in FIG. 14, the recorded result of the failure determination for cell A-4 indicates that data has not been acquired. Thus, an alarm signal for the cell A-4 may be transmitted from an arbitrary wireless base station device 20 among the wireless base station devices 20B through 20G. When the alarm signal for the cell A-4 is received by the completion of the next monitoring period timer, the call processing unit 211 of the wireless base station device 20A executes the resetting process for cell A4.

When the occurrence of a failure results from a software problem such as a bug with respect to the call process, the failure of the cell may be restored by the resetting process executed by the call processing unit 211. Further, when the occurrence of a failure results from a hardware problem such as a trouble of the wireless communication interface 23, a maintenance manager specifies a cell where a failure occurred by the failure alarm reported to the failure monitoring device 40 and may do a recovery job for the specified cell.

In this way, according to the wireless base station device of the first embodiment, the wireless base station device can detect the occurrence of a failure in the transmission function from the wireless base station device to a corresponding cell without deeming the failure as a silent failure. Further, according to the wireless base station device of the first embodiment, the wireless base station device can specify a cell in which a failure occurs at an early stage and can recover the cell at an early stage.

Second Embodiment

A wireless base station device in accordance with the second embodiment is configured to detect the occurrence of a failure in a transmission function from the wireless base station device to a corresponding cell without deeming the failure as a silent failure, similarly to the wireless base station device in accordance with the first embodiment. For example, the wireless base station device in accordance with the second embodiment detects a failure in the first cell when the wireless base station device determines that a measurement report signal which includes a measurement report for the second cell, measured by the mobile terminal device 10 existing in a coverage area in the first cell, and which does not include a measurement report for the first cell is received.

FIG. 15 is an exemplary configuration diagram of a wireless base station device in accordance with the second embodiment. In FIG. 15, the same reference numerals are applied to the same components of the wireless base station device 50 in accordance with the second embodiment as those of the wireless base station device 20. As illustrated in FIG. 15, the wireless base station device 50 includes a CPU 21, a memory 22, a wireless communication interface 23, an antenna 24, and a network interface 25. Further, as illustrated in FIG. 15, the CPU 21 of the wireless base station device 50 includes a call-process monitoring and control unit 51A. The memory 22 of the wireless base station device 50 includes a coverage area table 52A, a coverage rate table 52B, and a cell state table 22B.

The call-process monitoring and control unit 51A processes a signal transmitted and received between the mobile terminal device 10 requesting to connect to the wireless base station device 50 and the wireless base station device 50, a signal transmitted and received in response to a call request to the mobile terminal device 10 existing in a cell formed by the wireless base station device 50, etc. Further, the call-process monitoring and control unit 51A monitors the occurrence of a failure in the wireless base station device 50.

The coverage area table 52A is a table to record a cell for each divided section, the wireless quality of the broadcast signal for which is reported from the mobile terminal device 10 existing in the divided section. The divided section refers to a section into which a peripheral area of the wireless base station device 50, including a communication area of the wireless base station device 50, is divided. The coverage rate table 52B is a table in which a coverage rate is recorded for each cell. The coverage rate is a ratio of the number of registered sections to the maximum number of sections. The maximum number of sections is the maximum number of divided sections from which the wireless quality of the cell has been reported in the past up to the present point in time, and the number of registered sections is the number of divided sections from which the wireless quality of the cell may be reported at the present point in time. The cell state table 22B is a table to record for each cell whether or not a failure has occurred in accordance with operation states.

Figure 16:
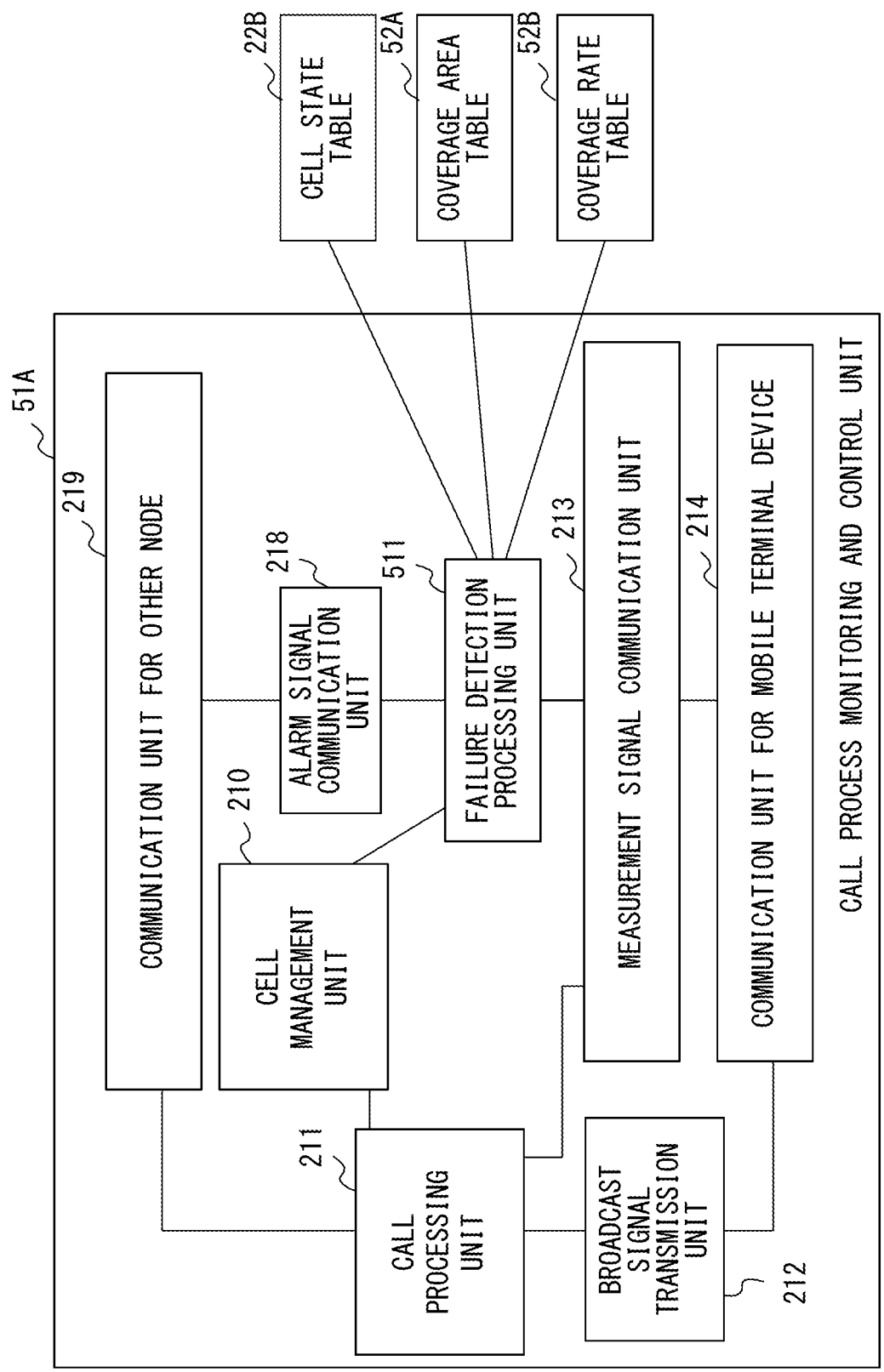
FIG. 16 is an exemplary configuration diagram of a call-process monitoring and control unit in accordance with the second embodiment.

FIG. 16 is an exemplary configuration diagram of a call-process monitoring and control unit in accordance with the second embodiment. In FIG. 16, the same reference numerals are applied to the same components of the call-process monitoring and control unit 51A as those of a call-process monitoring and control unit 21A. As illustrated in FIG. 16, the call-process monitoring and control unit 51A includes a cell management unit 210, a call processing unit 211, a broadcast signal transmission unit 212, a measurement signal communication unit 213, and a communication unit for mobile terminal device 214. Further, the call-process monitoring and control unit 51A includes a failure detection processing unit 511, an alarm signal transmission unit 218, and a communication unit for other node 219.

Each of the cell management unit 210, the call processing unit 211, the broadcast signal transmission unit 212, the measurement signal communication 213, the communication unit for mobile terminal device 214, the alarm signal transmission unit 218, and the communication unit for other node 219 may be the same in operation as each of those components included in the call-process monitoring control unit 21A except that those components operate in the call-process monitoring and control unit 51A.

The failure detection processing unit 511 records a measurement report of wireless quality included in a measurement report signal received by the measurement signal communication unit 213 in the coverage area table 52A and the coverage rate table 52B. Then, the failure detection processing unit 511 determines whether or not a failure occurs in each cell by using the coverage area table 52A and the coverage rate table 52B in which the measurement report is recorded and the cell state table 22B in which an operation state for each cell of the wireless base station device 50 and a peripheral wireless base station device 50 is recorded. Namely, the failure detection processing unit 511 detects a cell to which a radio wave including the broadcast signal and the measurement instruction signal is not transmitted from the wireless base station device 50 as a cell where a failure occurred.

In particular, in accordance with position information of the mobile terminal device 10 included in the measurement report signal received by the measurement signal communication unit 213, the failure detection processing unit 511 specifies a position of the mobile terminal device 10 that transmits the received measurement report signal. The failure detection processing unit 511 then extracts a divided section that includes a specified position among the divided sections into which a peripheral area of the wireless base station device 50 is divided, and converts a position from which the received measurement report signal is transmitted into the extracted divided section. Further, the failure detection processing unit 511 extracts a cell for which wireless quality included in the received measurement report signal is reported.

The failure detection processing unit 511 makes the divided section extracted from the measurement report signal and all of the cells extracted from the measurement report signal correspond with each other, and records them in the coverage area table 52A. That is, when the extracted cell is not recorded correspondingly with the extracted divided section in the coverage area table 52A, the failure detection processing unit 511 newly records the extracted cell in correspondence with the extracted divided section. On the other hand, when there is a cell not extracted from the measurement report signal among the cells already recorded in the coverage area table 52A in correspondence with the extracted divided section, the failure detection processing unit 511 deletes the cell in correspondence with the extracted divided section from the record. As a result of the recording process executed by the failure detection processing unit 511, the cell for which the wireless quality of the broadcast signal is reported in the divided section is recorded for each divided section in the coverage area table 52A.

The failure detection processing unit 511 records a divided section extracted from the measurement report signal as a coverage area of the cell extracted from the measurement report signal in the coverage rate table 52B. Further, the failure detection processing unit 511 calculates the number of registered sections, the maximum number of sections, and a coverage rate for the cell extracted from the measurement report signal. That is, when the extracted cell is not recorded in the coverage area table 52A in correspondence with the extracted divided section, the failure detection processing unit 511 newly records the extracted divided section as a coverage area of the extracted cell in the coverage rate table 52B. In addition, the failure detection processing unit 511 increments the number of registered sections and the maximum number of sections for the extracted cells and calculates a coverage rate of the extracted cells. On the other hand, when there is a cell not extracted from the measurement report signal among the cells already recorded in the coverage area table 52A in correspondence with the extracted divided section, the failure detection processing unit 511 deletes the divided section from the record as a coverage area of the extracted cell. Further, the failure detection processing unit 511 decrements the number of registered sections of the extracted cells and calculates a coverage rate of the extracted cells.

As a result of the calculation of the coverage rate, when the coverage rate of the cells is less than a specified threshold value, the failure detection processing unit 511 confirms whether an operation state of the cell is in operation or not with reference to the cell state table 22B. When the operation state of the cell is confirmed to be in operation, the failure detection processing unit 511 determines that there is a failure in the cell. On the other hand, when the operation state of the cell is confirmed to be under suspension, the failure detection processing unit 511 defers determining whether or not a failure occurs in the cell. The failure of the cell for which the determination is deferred may be detected by an alarm signal transmitted from the other wireless base station device 50.

The failure detection processing unit 511 notifies the alarm signal transmission unit 218 of the cell for which the occurrence of a failure is determined. The alarm signal transmission unit 218 generates an alarm signal indicating that a failure occurred in the cell reported by the failure detection processing unit 511, and transmits the generated alarm signal to the failure monitoring device 40 via the communication unit for other node 219. Further, when the reported cell is a cell corresponding to a peripheral wireless base station device 50, the alarm signal transmission unit 218 transmits the generated alarm signal to the failure monitoring device 40 as well as to a wireless base station device 50 corresponding to the cell via the communication unit for other node 219.

The failure detection processing unit 511 notifies the cell management unit 210 of a cell corresponding to the wireless base station device 50 among the cells for which the occurrence of a failure has been determined. The cell management unit 210 instructs the call processing unit 211 to execute a resetting process for the cell for which the occurrence of the failure is reported by the failure detection processing unit 511.

The call processing unit 211 executes the resetting process for the cell designated by the cell management unit 210. Further, when an alarm signal for a cell for which the determination of the occurrence of a failure is deferred is transmitted from the other wireless base station device 50 and is received via the communication unit for other node 219, the call processing unit 211 executes the resetting process for the cell indicated by the received alarm signal.

The wireless system in accordance with the second embodiment may have the same configuration as the configuration of the wireless system 1 illustrated in FIG. 1 except that the wireless base station device 50 is included in place of the wireless base station device 20.

An example of a failure detection method executed by the wireless base station device 50 will be described below. The wireless base station device 50 that executes a failure detection method in accordance with the second embodiment and the peripheral wireless base station devices 50 may not have the same arrangement as the wireless base station devices 20A through 20G illustrated in FIG. 5. Note that the arrangement illustrated in FIG. 5 is only by way of example, and each wireless base station device 50 may be arranged arbitrarily and the number of the wireless base station devices 50 may be any number. Further, a communication area of each wireless base station device 50 may have an elliptical shape as illustrated in FIG. 5. In the description set forth hereinafter, the wireless base station devices 20A through 20G illustrated in FIG. 5 are replaced with the wireless base station devices 50A through 50G as examples of the wireless base station devices 50, and a failure detection method that the wireless base station device 50A executes will be described below.

First, the wireless base station device 50 holds the coverage area table 52A of which a format is as illustrated in FIG. 17 in the memory 22 in advance. Further, the wireless base station device 50 holds the coverage rate table 52B of which a format is as illustrated in FIG. 18 in the memory 22 in advance.

FIG. 17 is an exemplary diagram of a coverage area table. In FIG. 17, an exemplary diagram illustrates the coverage area table 52A held in the memory 22 of the wireless base station device 50A. In the example illustrated in FIG. 17, a coordinate mesh number and a report cell number are included as recording items in the coverage area table 52A.

The coordinate mesh number represents an identification number of each divided section into which a peripheral area of the wireless base station device 50 is divided. FIG. 19 is the second exemplary diagram allocated to the peripheral area of a wireless base station device 50. In FIG. 19, ellipses illustrated around the wireless base station devices 50A through 50C each represent communication areas of the wireless base station devices 50A through 50C. Although not illustrated in FIG. 19, the communication area of the wireless base station device 50A is formed from cell A-1 through cell A6, similarly to the communication area of the wireless base station device 20A illustrated in FIG. 7. In the example illustrated in FIG. 19, the peripheral area of the wireless base station device 50A, which includes the communication area of the wireless base station device 50A, is divided into 96 mesh-like division sections by latitude and longitude, and proper coordinate mesh numbers 1 through 96 are each allocated to the divided sections. Thus, in the example illustrated in FIG. 17, each of coordinate mesh numbers 1 through 96 is registered in each row of a "coordinate mesh number" field of the coverage area table 52A. Note that coordinate mesh number " . . . " described in FIG. 17 represents a certain mesh number other than the mesh numbers expressly indicated in FIG. 17. Further, FIG. 19 is exemplified only for explanation and a method for the division of a peripheral area of the wireless base station device 50A and a method for the allocation of a coordinate mesh number may be any other method.

The report cell number represents an identifier of a cell for which the wireless quality of the broadcast signal is reported by a measurement report signal transmitted from the mobile terminal device 10 existing in the divided section. The report cell number recorded in the coverage area table 52A may include a cell number of each cell corresponding to the wireless base station device 50 and a cell number of each cell corresponding to the peripheral wireless base station device 50. In the exemplary arrangement in FIG. 5, a number of each cell corresponding to the wireless base station device 50A and a cell number of each cell corresponding to the peripheral wireless base station devices 50B through 50G may be included.

FIG. 18 is an exemplary diagram of a coverage rate table. In FIG. 18, an example of the coverage rate table 52B held in the memory 22 of the wireless base station device 50A is illustrated. In the example illustrated in FIG. 18, a cell number, a coordinate mesh number, the number of registered sections, the maximum number of sections, and a coverage rate are included as record items in the coverage rate table 52B.

The cell number represents an identifier of each cell corresponding to the wireless base station device 50 and an identifier of each cell corresponding to the peripheral wireless base station device 50. In the arrangement example illustrated in FIG. 5, each cell number corresponding to the wireless base station device 50A and each cell number corresponding to each of the peripheral wireless base station devices 50B through 50G are registered on each row of a "cell number" field in advance. Note that the cell number " . . . " described in FIG. 18 represents a certain cell number other than the cell numbers expressly set forth in FIG. 18.

The coordinate mesh number represents an identification number of each divided section into which the peripheral area of the wireless base station device 50 is divided, similarly to the coordinate mesh number of the coverage area table 52A. In the "coordinate mesh number" field in the coverage area table 52A, a coordinate mesh number of the divided section included in a coverage area of a cell of the corresponding cell number is recorded.

The number of registered sections represents the number of divided sections from which the wireless quality of the cell may be reported at the present point in time. The number of registered sections corresponds to the current extent of a coverage area for the cell, which is determined from the measurement report signal received at the present point in time. The maximum number of sections represents the maximum number of the divided sections from which the wireless quality of the cells has been reported in the past up to the present point in time. The maximum number of sections corresponds to the maximum extent of a coverage area for the cell, which is determined from the measurement report signal received up to the present point in time.

The coverage area table 52A and the coverage rate table 52B are set to the initial state when the wireless base station device 50 is set, when a configuration of a cell corresponding to the wireless base station device 50 is changed, and when a configuration of a cell corresponding to the peripheral wireless base station device 50 is changed. The symbol "–" described in FIG. 17 and FIG. 18 indicates an initial value. The initial value may be a numerical value "0", for example. Further, the coverage area table 52A illustrated in FIG. 17 and the coverage rate table 52B illustrated in FIG. 18 may be held for each frequency used by the wireless base station device 50.

After the coverage area table 52A and the coverage rate table 52B are held, the broadcast signal transmission unit 212 of the wireless base station device 50 transmits the broadcast signal to each cell corresponding to the wireless base station device 50. For example, the broadcast signal transmission unit 212 of the wireless base station device 50A transmits the broadcast signal to cell A-1 through cell A6 as illustrated in FIG. 7. Further, each broadcast signal transmission unit 212 of the peripheral wireless base station devices 50B through 50G transmits the broadcast signal to each corresponding cell.

The measurement signal communication unit 213 receives a measurement report signal transmitted from the mobile terminal device 10 in accordance with the transmitted measurement instruction signal. The received measurement report signal includes position information and quality information of more than one cell, as illustrated in FIG. 8. The position information included in the measurement report signal is information indicating a position of a mobile terminal device 10 that has measured the wireless quality, and includes a latitude and a longitude of the position where the mobile terminal device 10 exists, for example. Each piece of quality information included in the measurement report signal includes the wireless quality of a broadcast signal that the mobile terminal device 10 has measured and a cell number (cell identifier) of a cell to which the broadcast signal has been transmitted.

Figure 20B:
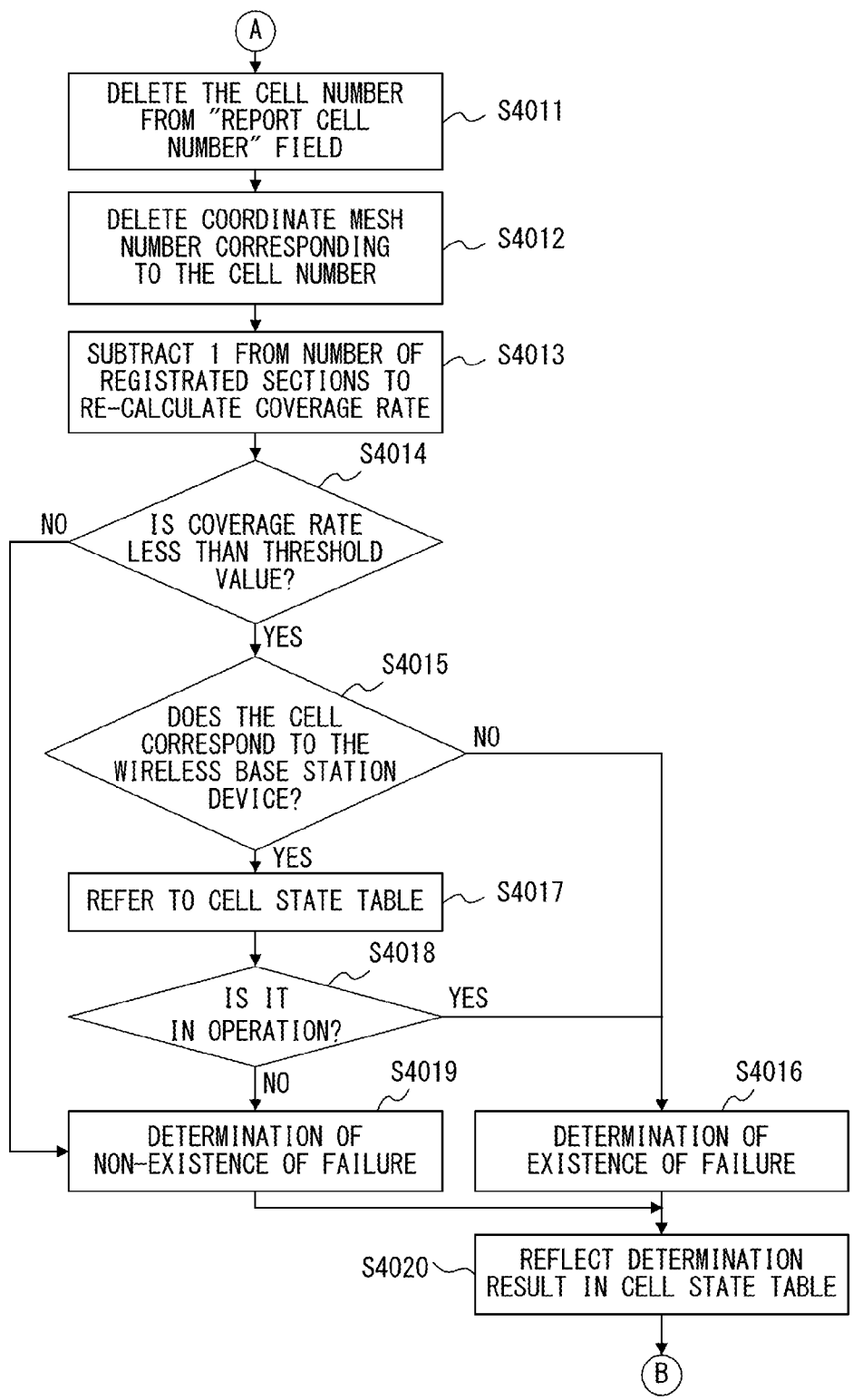
FIG. 20B is an exemplary flow chart of a failure detection process executed by a failure detection processing unit in accordance with the second embodiment.

The failure detection processing unit 511 executes a failure detection process using a measurement report signal received by the measurement signal communication unit 213. FIG. 20A and FIG. 20B are flowcharts for an exemplary failure detection process executed by a failure detection processing unit in accordance with the second embodiment.

When the measurement report signal is received and a series of the failure detection processes are initiated (step S4001), the failure detection processing unit 511 specifies a position of a mobile terminal device 10 that has transmitted a measurement report signal received by the measurement signal communication unit 213 in accordance with position information included in the received measurement report signal. Then, the failure detection processing unit 511 converts the position from which the received measurement report signal has been transmitted into a divided section including the specified position, and extracts a coordinate mesh number of the converted divided section (step S4002).

The failure detection processing unit 511 extracts cell numbers of all cells for which wireless qualities have been reported by the measurement report signal received by the measurement signal communication unit 213 (step S4003). The failure detection processing unit 511 then compares the report cell number which is recorded in the coverage area table 52A and which corresponds to the extracted coordinate mesh number with the cell number of the extracted cell (step S4004).

As a result of the comparison in step S4004, when there is a cell number that is not recorded in the coverage area table 52A as a report cell number corresponding to the extracted coordinate mesh number among the cell numbers of the extracted cells ("(1)" in step S4004), a series of the detection processes are advanced to a process in step S4005.

In the coverage area table 52A, the failure detection processing unit 511 additionally registers the cell number of the extracted cell in the "report cell number" field corresponding to the extracted coordinate mesh number (step S4005). Further, in the coverage rate table 52B, the failure detection processing unit 511 additionally registers the extracted coordinate mesh number in the "coordinate mesh number" field corresponding to the cell number of the extracted cell (step S4006).

The failure detection processing unit 511 adds 1 to the number of divided sections corresponding to the cell number of the extracted cell (step S4007). The failure detection processing unit 511 then determines whether the added number of the divided sections for the cell is larger than the maximum number of sections for the cell (step S4008).

When it is determined that the added number of the divided sections for the cell is larger than the maximum number of sections for the cell ("YES" in step S4008), the failure detection processing unit 511 records the added number of the divided sections for the cell as the maximum number of sections for the cell in the coverage rate table 52B (step S4009). When it is determined that the added number of the divided sections for the added cell is equal to or less than the maximum number of sections for the cell ("NO" in step S4008), the failure detection processing unit 511 proceeds to a process in step S4010.

The failure detection processing unit 511 divides the number of divided sections for the cell by the maximum number of sections for the cell to calculate a coverage rate of the cell (step S4010). The failure detection processing unit 511 then completes a series of the failure detection processes for the received measurement report signal (step S4021).

An example of processes from step S4006 through step S4010 will be described below. It is assumed that a measurement report signal is received when the coverage area table 52A and the coverage rate table 52B are in such initial states as illustrated in FIG. 17 and FIG. 18, for example. Also, it is assumed that a coordinate mesh number of a divided section extracted in accordance with a position coordinate of the received measurement report signal is 33. It is assumed that a cell number of cell for which wireless quality is reported by the received measurement report signal is cell A-2, cell A-3, cell B-4, and cell B-5. When the coverage area table 52A is in the initial state, no report cell number is recorded in the "report cell number" field corresponding to the extracted coordinate mesh number 33. The failure detection processing unit 511 then determines that among the cell numbers of the extracted cells, there are cell numbers of cell A-2, cell A-3, cell B-4, and cell B-5 which are not recorded in the coverage area table 52A as a report cell number corresponding to the extracted coordinate mesh number ("1" in step S4004).

FIG. 21 is an exemplary diagram of a coverage area table for which registration is processed. In step S4005, the failure detection processing unit 511 additionally registers cell A-2, cell A-3, cell B-4, and cell B-5 as cell numbers in the "report cell number" field corresponding to the extracted coordinate mesh number 33 (FIG. 21).

FIG. 22 is an exemplary diagram of a coverage rate table for which registration is processed. In step S4006, the failure detection processing unit 511 additionally registers the extracted coordinate mesh number 33 in each of the "coordinate mesh number" fields corresponding to cell A-2, cell A-3, cell B-4, and cell B-5 (FIG. 22). In step S4007, the failure detection processing unit 511 adds "1" to each of the number of registered sections corresponding to cell A-2, cell A-3, cell B-4, and cell B-5 (FIG. 22). Since the added number of registered sections "1" is larger than the maximum number of sections "0" in the initial state ("YES" in step S4008), the failure detection processing unit 511 changes each of the maximum number of sections to "1" which is the same number as the number of registered sections (FIG. 22) in step S4009. In step S4010, the failure detection processing unit 511 divides the number of registered sections "1" by the maximum number of sections "1" to calculate each coverage rate, and records the calculated coverage rate "100%" (FIG. 22).

As a result of the comparison in step S4004, when cell numbers of all cells extracted from the received measurement report signal match with all report cell numbers which corresponds to the extracted coordinate mesh numbers recorded in the coverage area table 52A ("(2)" in step S4004), a series of the failure detection processes for the received measurement report signal are terminated (step S4021).

For example, it is assumed that a measurement report signal is received when the coverage area table 52A and the coverage rate table 52B are in such a recording state as illustrated in FIG. 23 and FIG. 24. FIG. 23 is an exemplary diagram of a coverage area table at certain time. FIG. 24 is an exemplary diagram of a coverage rate table at certain time. It is assumed that a coordinate mesh number of a divided section extracted in accordance with a position coordinate of a received measurement report signal is 32. It is assumed that cells for which wireless qualities are reported by the received measurement report signal are cell A-2, cell A-3, and cell B-5.

When the coverage area table 52A is in a recording state as illustrated in FIG. 23, cell A-2, cell A-3, and cell B-5 are recorded in the "report cell number" field corresponding to the extracted coordinate mesh number 32 as a report cell number. Thus, the failure detection processing unit 511 determines that all cell numbers of cells extracted from the received report signal match with all report cell numbers corresponding to the extracted coordinate mesh number recorded in the coverage table 52A ("(2)" in step S4004). When "(2)" is determined in step S4004, the reception environment of a radio wave transmitted to the cells already recorded in the coverage area table 52A and the coverage rate table 52B remain unchanged. Thus, the failure detection processing unit 511 terminates a series of the failure detection processes (step S4021).

As a result of the comparison in step S4004, when there is a report cell number not extracted from the received measurement report signal among the report cell numbers already recorded in the coverage area table 52A corresponding to the coordinate mesh numbers extracted from the received measurement report signal ("(3)" in step S4004), a series of the failure detection processes are advanced to the process in step S4011.

In the coverage area table 52A, the failure detection processing unit 511 deletes the report cell number from the "report cell number" field corresponding to the extracted coordinate mesh number (step S4011). Further, in the coverage rate table 52B, the failure detection processing unit 511 deletes the extracted coordinate mesh number from the "coordinate mesh number" field corresponding to the same cell number as the report cell number (step S4012).

In the coverage rate table 52B, the failure detection processing unit 511 subtracts 1 from the number of divided sections corresponding to the same cell number as the report cell number. The failure detection processing unit 511 then divides the subtracted number of divided sections for the cells by the maximum number of sections for the cells to calculate a coverage rate of the cell (step S4013). The failure detection processing unit 511 determines whether the calculated coverage rate is less than a specified threshold value or not (step S4014).

When it is determined that the calculated coverage rate is equal to or greater than the specified threshold value ("NO" in step S4014), the failure detection processing unit 511 determines that no failure has occurred in the cell of the report cell number (step S4019). On the other hand, when it is determined that the calculated coverage rate is less than the specified threshold value ("YES" in step S4014), the failure detection processing unit 511 determines whether or not the cell of the report cell number is a cell corresponding to the wireless base station device 50 that executes a series of the failure detection processes (step S4015).

When it is determined that the cell of the report cell number is not a cell corresponding to the wireless base station device 50 that executes the failure detection process ("NO" in step S4015), the failure detection processing unit 511 determines that a failure has occurred in the cell of the cell number (step S4016). The wireless base station device 50 that executes the failure detection process does not grasp an operation state of each cell corresponding to the other wireless base station device 50. The failure detection processing unit 511 deems the operation state of each cell corresponding to the other wireless base station device 50 as an in-operation state, and determines that a failure occurs in a cell for which wireless quality is not reported from divided sections recorded as a coverage area in spite of an in-operation state.

When it is determined that the cell of the report cell number is a cell corresponding to the wireless base station device 50 ("YES" in step S4015), the failure detection processing unit 511 refers to the cell state table 22B (step S4017). The failure detection processing unit 511 then confirms whether the operation state for the cell of the report cell number is an in-operation state or not (step S4018).

When an operation state for the cell of the report cell number is confirmed to be a wave-stopped state ("NO" in step S4018), the failure detection processing unit 511 determines that no failure has occurred in the cell of the cell report number (step S4019). On the other hand, when an operation state for the cell of the report cell number is confirmed to be an in-operation state ("YES" in step S4018), the failure detection processing unit 511 determines that a failure has occurred in the cell of the report cell number (step S4016).

The failure detection processing unit 511 records the failure determination result in step S4016 or step S4019 in the cell state table 22B (step S4020). Then, a series of the failure detection processes for the received measurement report signal are terminated (step S4021).

One example of processes in step S4011 through step S4020 will be described below. For example, it is assumed that a measurement report signal is received when the coverage area table 52A and the coverage rate table 52B at a certain time are in such a recording state as illustrated in FIG. 23 and FIG. 24, respectively. Further, it is assumed that a coordinate mesh number of a divided section extracted in accordance with a position coordinate of the received measurement report signal is 33. It is assumed that a cell number of a cell for which wireless quality is reported by the received measurement report signal is cell A-3, cell B-4, and cell B-5.

When the coverage area table 52A is in a recording state as illustrated in FIG. 23, a report cell number A-2 which is recorded in the "report cell number" field corresponding to the extracted coordinate mesh number 33 does not exist in a cell number reported by the received measurement report signal. Thus, the failure detection processing unit 511 determines that there is a report cell number A-2 not extracted from the received measurement report signal in the report cell number which has already recorded in the coverage area table 52A and which corresponds to the coordinate mesh number extracted from the received measurement report signal ("(3)" in step S4004).

FIG. 25 is an exemplary diagram of a coverage area table in which a deletion process is executed. In step S4011, the failure detection processing unit 511 deletes the report cell number A-2 from the "report cell number" field corresponding to the extracted coordinate mesh number 33 in the coverage area table 52A (FIG. 25).

FIG. 26 is an exemplary diagram of a coverage rate table in which a deletion process is executed. In step S4012, the failure detection processing unit 511 deletes the extracted mesh number 33 from the "coordinate mesh number" field corresponding to the same cell number as the report cell number A-2 in the coverage rate table 52B (FIG. 26). In step S4013, the failure detection processing unit 511 subtracts 1 from the number of divided sections "15" which corresponds to the same cell number as the report cell number A-2 in the coverage rate table 52B (FIG. 26). The failure detection processing unit 511 then divides the subtracted number of divided sections "14" for the cell by the maximum number of sections "15" for the cell to calculate a coverage rate "93"% of the cell (FIG. 26). In step S4014, the failure detection processing unit 511 determines whether the calculated coverage rate is less than a specified threshold value or not.

It is assumed that the specified threshold value is set to 90%, for example. In this case, in step S4014, the failure detection processing unit 511 determines that the calculated coverage rate (93%) is equal to or greater than the specified threshold value ("90%"). Thus, in step S4019, the failure detection processing unit 511 determines that no failure has occurred in the cell of the report cell number A-2. In step S4020, the failure detection processing unit 511 records no failure as a failure determination result of the report cell number A-2 in the cell state table 22B. Then, in step S4021, a series of the failure detection processes for the received measurement report signal are terminated.

Thereafter, it is assumed that a measurement report signal is newly received. It is assumed that a coordinate mesh number of a divided section extracted in accordance with a position coordinate of a received measurement report signal is 34. In addition, it is assumed that a cell number of cell for which wireless quality is reported by the received measurement report signal are cell A-3, cell B-4, and cell B-5. In the coverage area table 52A illustrated in FIG. 25, the report cell number corresponding to the coordinate mesh number 34 is cell A-2, cell A-3, cell B-4, and cell B-5. However, in the newly received measurement report signal, no wireless quality for the cell A-2 has been reported.

A case such as this in which no wireless quality of a broadcast signal for the same cell has been reported in a plurality of measurement report signals may be caused when no radio wave such as a broadcast signal and a measurement report signal is transmitted from the wireless base station device 50A to the cell A-2, for example. When a failure has occurred in the transmission function from the wireless base station 50A to the cell A-2, the mobile terminal device 10 existing in and out of the cell A-2 may not receive the broadcast signal. Therefore, measurement report signals transmitted from the mobile terminal devices 10 existing in an arbitrary divided section do not include the wireless quality information of the cell A-2. That is, in the coverage rate table 52B illustrated in FIG. 26, the measurement report signals transmitted from the mobile terminal devices 10 existing in each divided sections of the coordinate mesh numbers 18~22, 30~32, 34~35, and 42~45 will not include the wireless quality information of the cell A-2.

In this way, when a failure occurred in the transmission function from the wireless base station device 50 to the cell A-2, it may be determined that there is the report cell number A-2 not extracted from the received measurement report signal in report cell numbers which have already been recorded in the coverage area table 52A and which correspond to the coordinate mesh number extracted from the received measurement report signal ("(3)" in step S4004). As a result, processes from step S4011 through step S4013 are repeated, the number of registered sections corresponding to the report cell number A-2 in the coverage rate table 52B decreases, and a coverage rate of the cell A-2 decreases to be less than the threshold value ("YES" in step S4014).

FIG. 27 is the second exemplary diagram of a cell state table. Cell A-2 is a cell corresponding to the wireless base station device 50A that executes a series of failure detection processes ("YES" in step S4015). With that, when an operation state of the cell A-2 is confirmed to be an in-operation state ("YES" in step S4018), the failure detection processing unit 511 determines that a failure has occurred in the cell A-2 (step S4016). Then, as illustrated in FIG. 27, the failure detection processing unit 511 records the occurrence of a failure in a "failure determination result" field corresponding to the cell A-2.

The failure detection processing unit 511 notifies the alarm signal transmission unit 218 of the cell for which the occurrence of a failure is determined. Further, the failure detection processing unit 511 notifies the cell management unit 210 of the cell for which the occurrence of a failure is determined among cells corresponding to the wireless base station device 50. In one example described above with reference to FIG. 23 through FIG. 27, the failure detection processing unit 511 notifies the alarm signal transmission unit 218 of the cell A-2 for which the occurrence of a failure is determined.

The alarm signal transmission unit 218 generates an alarm signal indicating that a failure has been detected in the cell reported by the failure detection processing unit 511, and transmits the generated alarm signal to the failure monitoring device 40. The alarm signal transmitted from the alarm signal transmission unit 218 is transmitted to the failure monitoring device 40 via a first IP interface such as an S1 interface provided by the network interface 25. In the example illustrated in FIG. 23 through FIG. 27, the alarm signal transmission unit 218 generates an alarm signal for cell A-2 and transmits the generated alarm signal to the failure monitoring device 40.

Further, the alarm signal transmission unit 218 transmits an alarm signal for a cell corresponding to the other wireless base station device 50 among cells reported from the failure detection processing unit 511 to the other wireless base station device 50. The alarm signal transmitted from the alarm signal transmission unit 218 is transmitted to the other wireless base station device 50 via the second IP interface, such as an X2 interface provided by the network interface 25.

The cell management unit 210 instructs the call processing unit 211 to perform a resetting process for the cell reported by the failure detection processing unit 511. In the example described above, the cell management unit 210 instructs the call processing unit 211 to perform a resetting process for the cell A-2.

The call processing unit 211 executes the resetting process instructed by the cell management unit 210. Further, when an alarm signal transmitted from the other wireless base station device 50 is received, the call processing unit 211 executes a resetting process for a cell indicated by the received alarm signal.

When a failure that occurred is caused by software problem such a bug with respect to a call processing, the failure of a cell may be restored by a resetting process executed by the call processing unit 211. Further, when a failure that occurred is caused by hardware problem such a trouble in a wireless communication interface 23, maintenance personnel may specify a cell in which a failure occurred and may carry out recovery operations for the specified cell.

In this way, according to the wireless base station device of the second embodiment, a failure that occurred in a transmission function from the wireless base station device to its corresponding cell may be detected without deeming the failure as a silent failure. Further, according to the wireless base station device of the second embodiment, a cell in which a failure occurred may be specified at an early stage and may be restored at an early stage.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless base station device, comprising:
   a broadcast signal transmission unit configured to transmit a broadcast signal to a cell corresponding to the wireless base station device;
   a measurement signal communication unit configured to transmit to a mobile terminal device existing in the cell a measurement instruction signal for instructing to perform a measurement of a wireless quality of the broadcast signal transmitted by the broadcast signal transmission unit and to receive a measurement report signal for reporting the measurement of the wireless quality for the cell from the mobile terminal device;
   a failure detection processing unit configured to detect a failure of a first cell with respect to a transmission function from the wireless base station to the first cell in accordance with whether a measurement report signal including a measurement report of a wireless quality for a second cell measured by a mobile terminal device existing in a coverage area of the first cell is received or not when a measurement report of a wireless quality for the first cell is not included in the measurement report signal received by the measurement signal communication unit; and
   an alarm signal transmission unit configured to receive from the failure detection processing unit a notification of the first cell in which a failure is detected when the failure of the first cell is detected by the failure detection processing unit and to transmit an alarm signal to notify a failure monitoring device of an occurrence of the failure of the first cell.

2. The wireless base station device according to claim 1, further comprising:
   a timer management unit configured to manage a monitoring period timer for monitoring an occurrence of a failure of each cell at a specified monitoring period; and a position coordinate detection unit configured to extract, for each measurement signal received until the monitoring period timer managed by the timer management unit is terminated, a cell for which a wireless quality has been reported by a received measurement report signal and a divided section including a position of a mobile terminal device which has transmitted the received measurement report signal among divided sections into which a peripheral area of the wireless base station device is divided, and to record the extracted cell and the extracted divided section in relation with each other in a report management table; wherein the failure detection processing unit
records the divided section recorded in relation with the extracted cell as a coverage area of the extracted cell after the monitoring period timer managed by the timer management unit is terminated, and
determines that a failure has occurred in the first cell when the measurement report of the wireless quality for the first cell does not exist in the report management table and when at least one of the divided sections included in the coverage area of the first cell is a divided section from which the wireless quality is reported for at least some other cells.

3. The wireless base station device according to claim 1, wherein the failure detection processing unit
extracts, for each received measurement signal, a cell for which a wireless quality is reported by a received measurement report signal and a divided section including a position of a mobile terminal device which has transmitted the received measurement report signal among the divided section into which a peripheral area of the wireless base station device is divided, and records the extracted cell and the extracted divided section in relation to each other in a coverage area table;
excludes the extracted divided section from a coverage area of the first cell when the first cell which is not extracted from the received measurement report signal exists in cells recorded in the coverage area table in relation to the divided section extracted from the received measurement report signal, and calculates a coverage rate for the first cell; and
determines that a failure occurred in the first cell when the calculated coverage area rate is less than a specified threshold value.

4. The wireless base station device according to claim 1, wherein
the alarm signal transmission device transmits the alarm signal to other wireless base station device corresponding to the first cell when the first cell is a cell corresponding to the other wireless base station device.

5. A wireless system comprising:
a mobile terminal device configured to receive a broadcast signal transmitted from a wireless base station device to a cell corresponding to the wireless base station device and a measurement instruction signal for instructing to perform a measurement of a wireless quality of the transmitted broadcast signal, to measure the wireless quality of the received broadcast signal in accordance with the received measurement instruction signal, and to transmit a measurement report signal including a measurement report of the wireless quality for the measured cell to the wireless base station; and
a wireless base station device configured to transmit the broadcast signal and the measurement instruction signal to a mobile terminal device existing in the cell, to receive the measurement report signal from the mobile terminal device, to detect a failure of a first cell with respect to a transmission function from the wireless base station device to the first cell in accordance with whether a measurement report signal including a measurement report of a wireless quality for a second cell measured by a mobile terminal device existing in a coverage area of the first cell is received or not when a measurement report of a wireless quality for the first cell is not included in the received measurement report signal, and to transmit to a failure monitoring device an alarm signal for reporting an occurrence of a failure of the first cell when the failure of the first cell is detected.

6. The wireless system according to claim 5, wherein the wireless base station device
manages a monitoring period timer for monitoring an occurrence of a failure of each cell at a specified monitoring period;
extracts, for each measurement signal received until the managed monitoring period timer is terminated, a cell for which a wireless quality has been reported by a received measurement report signal and a divided section including a position of a mobile terminal device that has transmitted the received measurement report signal among divided sections into which a peripheral area of the wireless base station device is divided, and records the extracted cell and the extracted divided section in relation with each other in a report management table;
records the divided section recorded in relation with the extracted cell in the report management table as a coverage area of the extracted cell after the managed monitoring period timer is terminated; and
determines that a failure has occurred in the first cell when the measurement report of the wireless quality for the first cell does not exist in the report management table and when at least one of divided sections included in the coverage area of the first cell is a divided section from which a wireless quality is reported for at least some other cells.

7. The wireless system according to claim 5, wherein the wireless base station device
extracts, for each received measurement signal, a cell for which a wireless quality is reported by a received measurement report signal and a divided section including a position of a mobile terminal device which has transmitted the received measurement report signal in a divided section into which a peripheral area of the wireless base station device is divided, and records the extracted cell and the extracted divided section in relation to each other in a coverage area table;
excludes the extracted divided section from a coverage area for the first cell when the first cell which is not extracted from the received measurement report signal exists in cells recorded in the coverage area table in relation to the divided section extracted from the received measurement report signal, and calculates a coverage rate for the first cell; and
determines that a failure has occurred in the first cell when the calculated coverage area rate is less than a specified threshold value.

8. The wireless system according to claim 5, wherein
the wireless base station device transmits the alarm signal to other wireless base station device corresponding to the first cell when the first cell is a cell corresponding to the other wireless base station device.

9. A failure detection method comprising:
transmitting, by a wireless base station device, a broadcast signal to a cell corresponding to the wireless base station device and transmitting a mobile terminal device existing in the cell a measurement instruction signal for instructing to perform a measurement of a wireless quality of the transmitted broadcast signal;

receiving, by the mobile terminal device, the broadcast signal and the measurement instruction signal which are transmitted from the wireless base station device, measuring a wireless quality of the received broadcast signal in accordance with the received measurement instruction signal, and transmitting a measurement report signal including a measurement report of the wireless quality for the measured cell to the wireless base station device; and receiving, by the wireless base station device, the measurement report signal from the mobile terminal device, detecting a failure of a first cell with respect to a transmission function from the wireless base station device to the first cell in accordance with whether a measurement report signal including a measurement report of a wireless quality for a second cell measured by the mobile termination device existing in a coverage area of the first cell is received or not when a measurement report of a wireless quality for the first cell is not included in the received measurement report signal, and transmitting an alarm signal for notifying a failure monitoring device of an occurrence of a failure of the first cell when the failure is detected in the first cell.

10. The failure detection method according to claim 9, wherein the wireless base station device manages a monitoring period timer for monitoring an occurrence of a failure of each cell at a specified monitoring period;

extracts, for each measurement signal received until the managed monitoring period timer is terminated, a cell for which a wireless quality has been reported by a received measurement report signal and a divided section including a position of a mobile terminal device which has transmitted the received measurement report signal in divided sections into which a peripheral area of the wireless base station device is divided, and records the extracted cell and the extracted divided section in relation with each other in a report management table;

records the divided section recorded in relation with the extracted cell in the report management table as a coverage area of the extracted cell after the managed monitoring period timer is terminated; and determines that a failure has occurred in the first cell when a measurement report of a wireless quality for the first cell does not exist in the report management table and when at least one of divided sections included in the coverage area of the first cell is a divided section from which a wireless quality is reported for at least some other cells.

11. The failure detection method according to claim 9, wherein the wireless base station device extracts, for each received measurement signal, a cell for which a wireless quality is reported by a received measurement report signal and a divided section including a position of a mobile terminal device which has transmitted the received measurement report signal among divided sections into which a peripheral area of the wireless base station device is divided, and records the extracted cell and the extracted divided section in relation to each other in a coverage area table;

excludes the extracted divided section from a coverage area of a first when the first cell which is not extracted from the received measurement report signal exists in cells recorded in the coverage area table in relation to the divided section extracted from the received measurement report signal, and calculates a coverage rate for the first cell; and determines that a failure has occurred in the first cell when the calculated coverage area rate is less than a specified threshold value.

12. The failure detection method according to claim 9, wherein the wireless base station device transmits the alarm signal to other wireless base station device corresponding to the first cell when the first cell is a cell corresponding to the other wireless base station device.

\* \* \* \* \*